(12) United States Patent
Kumar et al.

(10) Patent No.: US 11,283,861 B2
(45) Date of Patent: Mar. 22, 2022

(54) CONNECTION MANAGEMENT DURING NON-DISRUPTIVE UPGRADE OF NODES

(71) Applicant: EMC IP Holding Company LLC, Hopkinton, MA (US)

(72) Inventors: Shiv Kumar, Pune (IN); Avadut Mungre, North Goa (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 112 days.

(21) Appl. No.: 16/750,412

(22) Filed: Jan. 23, 2020

(65) Prior Publication Data

US 2021/0234923 A1    Jul. 29, 2021

(51) Int. Cl.

| | | |
|---|---|---|
| *H04L 29/08* | (2006.01) |
| *H04L 12/26* | (2006.01) |
| *H04L 67/1008* | (2022.01) |
| *H04L 67/101* | (2022.01) |
| *H04L 67/1012* | (2022.01) |
| *H04L 43/0817* | (2022.01) |
| *H04L 67/1034* | (2022.01) |
| *H04L 43/16* | (2022.01) |

(52) U.S. Cl.
CPC ...... *H04L 67/1008* (2013.01); *H04L 43/0817* (2013.01); *H04L 43/16* (2013.01); *H04L 67/101* (2013.01); *H04L 67/1012* (2013.01); *H04L 67/1034* (2013.01)

(58) Field of Classification Search
CPC .............. H04L 67/1008; H04L 67/101; H04L 67/1012; H04L 67/1034; H04L 43/0817; H04L 43/16
See application file for complete search history.

(56) References Cited

U.S. PATENT DOCUMENTS

| | | | |
|---|---|---|---|
| 2006/0130042 A1* | 6/2006 | Dias ...................... | G06F 9/5083 717/168 |
| 2014/0089495 A1* | 3/2014 | Akolkar ................ | H04L 41/147 709/224 |
| 2017/0206592 A1* | 7/2017 | Chen ................ | G06Q 10/06393 |

* cited by examiner

*Primary Examiner* — Jeffery F Harold
*Assistant Examiner* — Franklin S Andramuno
(74) *Attorney, Agent, or Firm* — Amin, Turocy & Watson, LLP

(57) ABSTRACT

Connection of clients to nodes associated with a storage system can be managed during non-disruptive upgrades (NDUs) of software or firmware of nodes. During NDU, connection manager component (CMC) manages connections of clients to nodes based on a node pool policy to determine nodes to consider for connection for a client request and a connection policy. CMC can determine whether to reduce a set of nodes to a subset of nodes having a particular upgrade status based on a threshold value associated with the particular upgrade status, which can be one of upgraded or non-upgraded. If threshold is satisfied for the set, CMC can reduce the set to the subset of nodes, and CMC can determine a node of the subset based on the connection policy. If threshold is not satisfied, the set is not reduced, and CMC determines a node from the set based on the connection policy.

20 Claims, 8 Drawing Sheets

CONNECTION MANAGEMENT DURING NON-DISRUPTIVE UPGRADE OF NODES

TECHNICAL FIELD

This disclosure relates generally to processing, communicating, and storing data, e.g., to connection management during non-disruptive upgrade of nodes.

BACKGROUND

A storage platform can be employed to store data. The storage platform can employ an operating system (e.g., a file system) and can serve as a file server. The file system typically can be employed to maintain files (e.g., electronic files), comprising data (e.g., electronic or digital data), including keeping track of the locations of files and associated data in memory to enable accessing of the files stored in, and retrieval of the files from, the memory of the storage platform. The files, including data associated with the files, often can be processed in a number of ways when data is being written to or read from files and when the files are being stored in, or retrieved from, the memory.

The above-described description is merely intended to provide a contextual overview regarding processing, communication, and storage of data, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise: with regard to a client request, and in response to determining that a non-disruptive upgrade of a group of nodes is in progress, determining, by a system comprising a processor, whether the group of nodes is to be reduced to a subgroup of nodes of the group of nodes based at least in part on respective upgrade statuses of respective nodes of the group of nodes and a first connection management criterion relating to a defined upgrade status. The method further can comprise: in response to determining that the group of nodes is to be reduced to the subgroup of nodes, determining, by the system, a node of the subgroup of nodes that is to be utilized to connect to a client device to service the client request based at least in part on a node characteristic associated with the subgroup of nodes and a second connection management criterion relating to the node characteristic.

In certain embodiments, the disclosed subject matter can comprise a system that can include a memory that stores computer executable components, and a processor that executes computer executable components stored in the memory. The computer executable components can comprise an update component that performs a non-disruptive upgrade of a group of nodes. The computer executable components also can include a connection manager component that, in response to determining that the non-disruptive upgrade of the group of nodes is in progress, determines whether to form a subgroup of nodes from the group of nodes based at least in part on respective upgrade statuses of respective nodes of the group of nodes and a first connection management criterion relating to a defined node upgrade status, wherein the subgroup of nodes is associated with the defined node upgrade status, wherein, in response to determining that the subgroup of nodes is to be formed from the group of nodes, the connection manager component determines a node of the subgroup of nodes that is to be utilized to connect to a client device to service a client request based at least in part on a node attribute associated with the subgroup of nodes and a second connection management criterion relating to the node attribute.

In still other embodiments, a machine-readable storage medium, comprising executable instructions that, when executed by a processor, facilitate performance of operations. The operations can comprise: in connection with a client request, and in response to determining that a non-disruptive upgrade of a set of nodes is occurring, determining whether to form a subset of nodes from the set of nodes based at least in part on respective upgrade statuses of respective nodes of the set of nodes and a first connection management criterion relating to a defined node upgrade status, wherein the subset of nodes is associated with the defined node upgrade status, and wherein the subset of nodes contains at least one less node than the set of nodes. The operations also can comprise: in response to determining that the subset of nodes is to be formed from the set of nodes, determining a node of the subset of nodes that is to be utilized to connect to a client device to service the client request based at least in part on a node characteristic associated with the subset of nodes and a second connection management criterion relating to the node characteristic The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
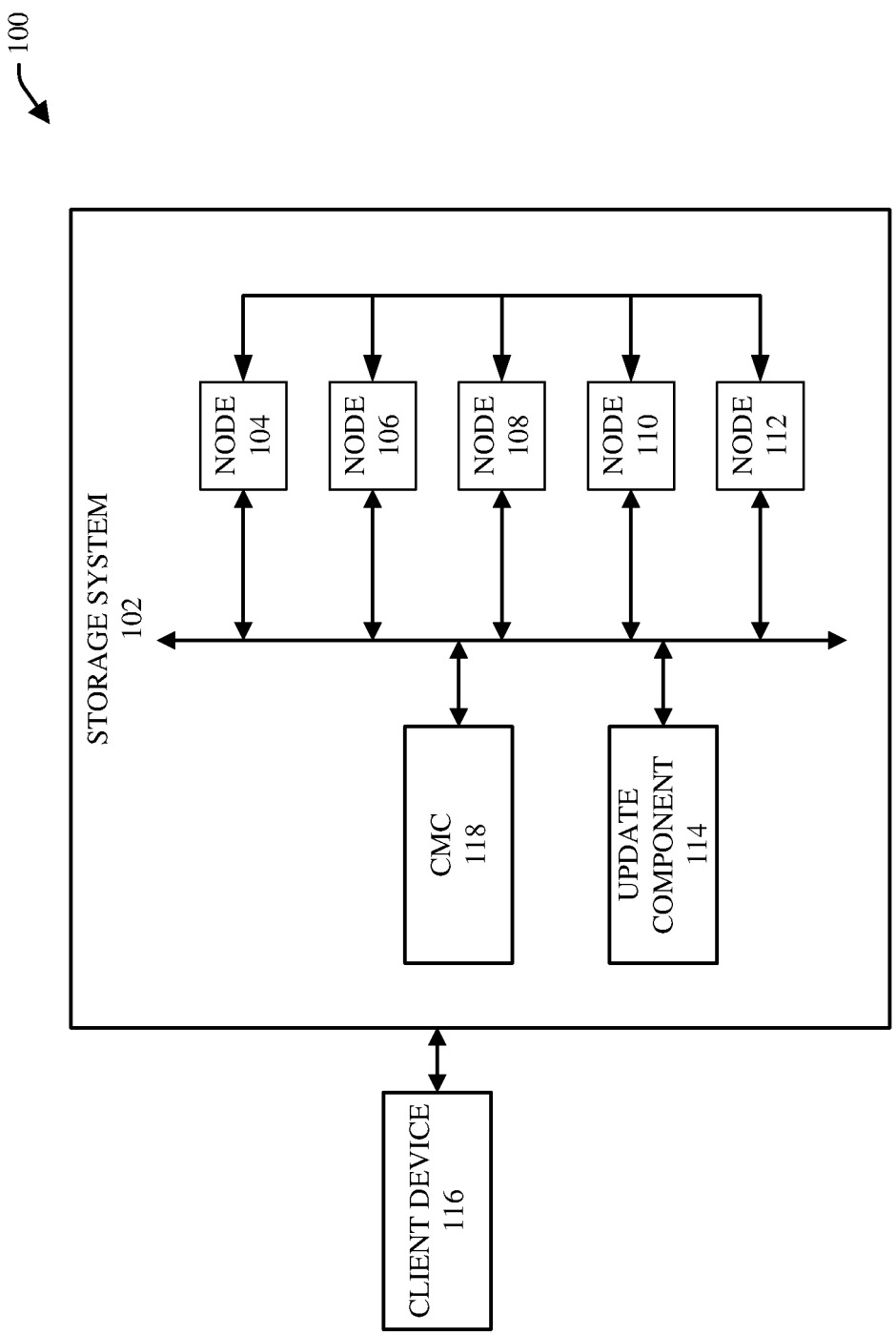
FIG. 1 illustrates a block diagram of an example system that can desirably determine a node to utilize to service a client request, based at least in part on the upgrade statuses of nodes of a set of nodes, with respect to an applicable upgrade status connection management criterion, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

A storage platform can be employed to store data. The storage platform can employ an operating system (e.g., a file system) and serve as a file server. The file system typically can be employed to maintain files (e.g., electronic files), comprising data (e.g., electronic or digital data), including keeping track of the locations of files and associated data in memory to enable accessing of the files stored in, and retrieval of the files from, the memory of the storage platform. The files, including data associated with the files, often can be processed in a number of ways when data is being written to or read from files and when the files are being stored in, or retrieved from, the memory.

Clients can desire to access, retrieve, or write data or a file from or to the file server. There can be a plurality of nodes that can be utilized to enable the clients to connect to the file server and access, retrieve, or write data or a file from or to the file server. A client can be connected to a node, wherein the node can be used to service the request of the client to access, retrieve, or write data or a file from or to the file server.

From time to time, nodes can be upgraded (e.g., updated) to upgrade or update software or firmware. One type of upgrade can be a disruptive upgrade where all of the nodes are taken offline at the same time and the upgrade is performed on all of the nodes. During a disruptive upgrade, there are no nodes available to service client requests from clients. Another type of upgrade can be a non-disruptive upgrade (NDU). During an NDU, some nodes can remain online and available to service client requests from clients while other nodes are offline and being upgraded.

During an NDU, some of the nodes may have been upgraded successfully to a higher software or firmware version, while other nodes can still be at a lower software or firmware version and waiting for an upgrade to the higher version. As a result, NDU can present some issues or problems. For instance, when a node has been upgraded to a higher version, the upgraded node can have newer and/or better features, which can be functional as soon as the node is upgraded to the higher version and back online irrespective of the upgrade status of the other nodes. Thus, an upgraded node can have different software or firmware behavior than a non-upgraded node that is still operating under the lower version of the software or firmware. As a result, two same or similar client requests can behave differently (e.g., can yield different results) if one client request is connected to an upgraded node with the higher version of the software or firmware and the other client request is connected to a non-upgraded node with the lower version.

Also, when a non-upgraded node is being utilized to handle a client request, the non-upgraded node can be terminated at any time, including during the handling of the client request, because that node can be selected for upgrade at any time in the process of the NDU. As a result, if the non-upgraded node is terminated so it can be upgraded during the servicing of the client request, the client request can be disrupted, which can result in the client not getting the desired results (e.g., accessing, reading, or retrieving desired data or a file, or writing desired data or a file) to the client request, can result in the client having to resubmit the request, and/or can result in an undesirable (e.g., inefficient) use of resources (e.g., processing resources, time resources, . . . ) to service the client request and provide responsive results.

Techniques for desirably (e.g., efficiently, suitably, or optimally) managing the connection of clients to nodes associated with a storage system during NDUs of the software or firmware of nodes are presented. During an NDU, a connection manager component (CMC) can manage connections of clients (e.g., client devices associated with clients) to nodes based at least in part on a node pool policy to determine nodes (e.g., subset of nodes) to consider for connection for a client request and a connection policy that can be implemented to facilitate determining which node of a subset of a set (e.g., group or pool) of nodes (or which node of the set of nodes) is to be selected to service the client request. In accordance with various embodiments, the CMC can determine whether to reduce a set of nodes to a subset of nodes (e.g., subset of available nodes) having a particular upgrade status based at least in part on a first connection management criterion of defined connection management criteria, wherein the first connection management criterion can relate to (e.g., can facilitate implementation of) the node pool policy. The first connection management criterion can indicate a defined upgrade status (e.g., the type of upgrade status, which can be upgraded status or non-upgraded status) under consideration and a defined threshold value (e.g., defined threshold number or percentage) associated with the defined upgrade status. The CMC can collect and analyze statistical data regarding the respective upgrade statuses of respective nodes of the set of nodes to determine the respective upgrade statuses of the respective nodes.

If the CMC determines that the defined threshold value is satisfied (e.g., met or exceeded) for the set of nodes, the CMC can determine that the set of nodes can be reduced to a subset of nodes associated with the defined upgrade status, and can reduce the set of nodes to the subset of nodes (e.g., subset of available nodes). For instance, the CMC can form a subset of nodes from the set of nodes, wherein the node or nodes of the subset of nodes each can have the particular type of upgrade status (e.g., either upgraded status, or, alternatively, non-upgraded status) corresponding to the defined upgrade status under consideration (e.g., being applied or implemented), and wherein the remaining nodes of the set of nodes that are not in the subset can have a different type of upgrade status than the defined upgrade status.

The CMC can determine a node of the subset of nodes to utilize to connect to a client device and service the client request based at least in part on the results of analyzing statistical data regarding a node characteristic associated with the nodes of the subset and a second connection management criterion of the defined connection management criteria. The second connection management criterion can relate to (e.g., can facilitate implementation of) the connection policy and can indicate the node characteristic (e.g., node attribute or node property) to be considered by the CMC. The node characteristic can relate to resource (e.g., central processing unit (CPU)) usage associated with a node, throughput (e.g., network throughput or aggregate network throughput) associated with a node, a connection count of a node, an order of a node in a round-robin ordering of nodes (e.g., subset of nodes), or another desired node characteristic. The CMC can connect or facilitate connecting the node to the client device, and the node can perform desired operations to service the client request.

If, instead, the CMC determines that the defined threshold value is not satisfied (e.g., the first connection management criterion is not satisfied), the CMC can determine that the set of nodes is not to be reduced. In such instance, the CMC can determine a node from the set of nodes based at least in part on the results of analyzing the statistical data and the second connection management criterion. The CMC can connect or facilitate connecting the node (e.g., determined and selected from the set of nodes) to the client device, and the node can perform desired operations to service the client request.

In other embodiments, the CMC can consider all nodes of the set of nodes, without determining whether to reduce the set of nodes to consider only a subset of nodes. The CMC can determine a node of the set of nodes to utilize to connect to a client device and service the client request based at least in part on the results of analyzing statistical data regarding a node characteristic associated with the nodes of the set of nodes and the second connection management criterion relating to the connection policy and indicating the node characteristic under consideration. The CMC can connect or facilitate connecting the node to the client device, and the node can perform desired operations to service the client request.

These and other aspects and embodiments of the disclosed subject matter will now be described with respect to the drawings.

Referring now to the drawings, FIG. 1 illustrates a block diagram of an example system 100 that can desirably (e.g., efficiently, suitably, or optimally) determine a node to utilize to service a client request, based at least in part on the upgrade statuses of nodes of a set of nodes, with respect to an applicable upgrade status connection management criterion, in accordance with various aspects and embodiments of the disclosed subject matter. The system 100 can comprise a storage system 102 that can be utilized to store information (e.g., files, data, . . . ), manage a file system of or associated with the storage system 102, and manage the storing, retrieving, and processing of files or data being written to, read from, or stored in the storage system 102.

The storage system 102 can comprise one or more sets (e.g., group(s), pool(s), cluster(s), or plurality) of nodes that can be employed to service client requests from clients with regard to storing, retrieving, and processing of files or data being written to, read from, or stored in the storage system 102. The storage system 102 can be scalable to add (or remove) nodes, as desired. The storage system 102 can include, for example, one or more clusters of nodes, wherein each cluster can comprise a desired number of nodes (e.g., one node, two nodes, three nodes, four nodes, . . . , 100 nodes, . . . , 144 nodes, . . . 200 nodes, . . . , 252 nodes, or more than 252 nodes). In some embodiments, the storage system 102 can comprise node 104, node 106, node 108, node 110, up through node 112.

Each node (e.g., 104, 106, 108, 110, or 112) can comprise a processor component (e.g., one or more processors, including a CPU), network components, data storage (e.g., storage media), memory (e.g., random access memory (RAM)), interconnect components (e.g., Ethernet or other low-latency interconnect components), controller components (e.g., disk controllers), and/or other desired components, as more fully described herein. Respective nodes (e.g., 104, 106, 108, 110, 112) of a cluster can be the same as or different from each other with regard to the respective components of the respective nodes and/or the respective features, capabilities, or capacities of the respective nodes. The nodes (e.g., 104, 106, 108, 110, or 112), employing their respective network components, can network to and communicate with each other, and can network to and communicate with other components or devices. Each of the nodes (e.g., 104, 106, 108, 110, or 112) can be associated with one or more IP addresses (e.g., virtual IP addresses) that can be used to facilitate respectively connecting the nodes to other devices (e.g., client devices) or components to facilitate communication of information between the nodes and the other device or components.

In certain embodiments, the storage system 102 can leverage the nodes of a cluster, for example, by grouping together respective components, features, or capabilities of the respective nodes. For instance, the storage system 102 can group together the respective memories of the respective nodes so that they can operate together (e.g., to form a single coherent cache memory), allow input/output (I/O) on any part of the cluster to benefit from data cached anywhere in the cluster, and/or combine (e.g., group) resources (e.g., processing resources, such as CPU), spindles, or other components of the nodes to increase throughput, capacity, I/O per second (IOPS), etc., of the cluster, particularly as the cluster grows in size (e.g., as more nodes are added to the cluster), etc.

The storage system 102 can comprise an update component 114 that can be associated with (e.g., communicatively connected to) each of the nodes (e.g., at desired times, such as during an update (e.g., NDU or disruptive upgrade) of nodes). The update component 114 can be employed to update (e.g., upgrade) or facilitate updating the software or firmware of the respective nodes (e.g., 104, 106, 108, 110, or 112) to a next or current version of software or firmware. In some embodiments, the update component 114 can perform an NDU to upgrade the software or firmware of the nodes, wherein some nodes can remain online and available to service client requests from clients while other nodes are offline and being upgraded. The nodes that remain online can comprise one or more nodes that already have been upgraded during the NDU or one or more nodes that have not yet been upgraded during the NDU. In other embodiments, the update component 114 can perform a disruptive upgrade, wherein all of the nodes of the storage system 102 can be taken offline during the upgrade.

At given times, one or more clients can utilize a client device, such as client device 116, to communicate with and access the storage system 102. The client device 116 can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, . . . ), a set-top box, an Internet Protocol (IP) television (IPTV), Internet of things (IoT) device (e.g., medical device, electronic speaker with voice controller, camera device, security device, tracking device, appliance, . . . ), or other desired type of communication device. The client device 116 can communicate a client request to the storage system 102 to request the storage system 102 access or retrieve information stored in the storage system 102, write or store information to or in the storage system 102, process information stored in the storage system 102 or received from the client device 116 or other data source (e.g., other device), and/or perform other operations on information of or associated with the storage system 102.

The storage system 102 can comprise a connection manager component (CMC) 118 that can be associated with (e.g., communicatively connected to) each of the nodes (e.g., 104, 106, 108, 110, or 112) and the update component 114. The CMC 118 can be utilized to manage connections between client devices (e.g., client device 116) of clients and the nodes (e.g., 104, 106, 108, 110, or 112) of the storage system 102, in accordance with the defined connection management criteria. For instance, during an NDU, the CMC 118 can manage connections of clients (e.g., client devices, such as client device 116, associated with clients) to nodes (e.g., 104, 106, 108, 110, or 112) based at least in part on a node pool policy to determine nodes (e.g., subset of nodes, or set of nodes) to consider for connection for a client request and a connection policy that can be implemented to facilitate determining which node of a subset of the set of nodes (or which node of the set of nodes) is to be selected to service the client request, in accordance with the defined connection management criteria.

The defined connection management criteria can comprise a first connection management criterion that can relate to or indicate a defined upgrade status (e.g., the type of upgraded status, such as upgraded status, or, alternatively, non-upgraded status) that is to be considered when determining which nodes to consider for use in servicing a client request. The first connection management criterion can relate to (e.g., can facilitate implementation of) the node pool policy and can be or can comprise an applicable upgrade status connection management criterion. In some embodiments, the defined upgrade status can be an upgraded status, wherein the CMC 118 can determine whether to consider only upgraded nodes of the set of nodes in deciding which node to utilize to service a client request. In other embodiments, the defined upgrade status can be a non-upgraded status, wherein the CMC 118 can determine whether to consider only non-upgraded nodes of the set of nodes in deciding which node to utilize to service a client request. In still other embodiments, the first connection management criterion can indicate that all nodes (e.g., all available nodes) in the set of nodes can be considered in deciding which node to utilize to service a client request, or, alternatively, the defined connection management criteria can indicate that the first connection management criterion can be bypassed and all nodes (e.g., all available nodes) of the set of nodes can be considered in deciding which node to utilize to service a client request.

The CMC 118 can monitor the set of nodes (e.g., 104, 106, 108, 110, 112) associated with the storage system 102. Based at least in part on such monitoring of the set of nodes, the CMC 118 can receive (e.g., collect, obtain, or aggregate) statistics regarding the set of nodes. For instance, the CMC 118 can comprise or be associated with (e.g., communicatively connected to) a daemon or other component of the storage system 102 that can collect various statistics from the nodes (e.g., 104, 106, 108, 110, 112) or from other sources (e.g., other components) associated with the nodes. The statistics can relate to various characteristics (e.g., attributes or properties) of the nodes (e.g., 104, 106, 108, 110, 112) of the set of nodes. For instance, the statistics can relate to respective resource usage (e.g., CPU usage) of respective nodes of the set of nodes, respective throughputs (e.g., network throughputs or aggregate network throughputs) of the respective nodes, respective client connections of the respective nodes, respective order positions (e.g., order slots) of the respective nodes in an ordering of nodes (e.g., round-robin ordering of nodes), respective upgrade statuses (e.g., upgraded or non-upgraded) of the respective nodes, and/or other desired statistics relating to the respective nodes.

When a client device 116 communicates a client request to the storage system 102, the CMC 118 can receive the client request, including the information contained in the client request. In response to the client request, the CMC 118 can check and determine the respective upgrade statuses of the respective nodes (e.g., 104, 106, 108, 110, or 112) of the set of nodes. For instance, the CMC 118 can analyze the statistical information, including the statistical information relating to the respective upgrade statuses of the respective nodes (e.g., 104, 106, 108, 110, or 112) of the set of nodes. Based at least in part on the results of the analysis of the statistical information relating to the respective upgrade statuses of the respective nodes, the CMC 118 can determine the respective upgrade statuses (e.g., upgraded to newer or higher version of software or firmware; or not upgraded to the newer or higher version of software or firmware) of the respective nodes.

In accordance with various embodiments, the CMC 118 can determine whether to reduce the set of nodes (e.g., 104, 106, 108, 110, 112) to a subset of nodes having a particular upgrade status (e.g., upgraded status, or, alternatively, non-upgraded status) based at least in part on the first connection management criterion. The first connection management criterion can indicate a defined upgrade status (e.g., the type of upgrade status, which can be upgraded status, or, alternatively, non-upgraded status), if any, under consideration and a defined threshold value (e.g., defined threshold number or percentage) associated with the defined upgrade status. The defined threshold value can be, for example, virtually any desired number ranging from one (e.g., one node) up to the number of nodes in the set of nodes, or virtually any desired percentage ranging from 1/x % to 100%, as indicated by the first connection management criterion, wherein x can be the number of nodes in the set of nodes. A user (e.g., storage system designer, storage system manager, storage system technician or maintenance person, client, or other entity) can specify or select the desired number or desired percentage to use for the defined threshold value.

The CMC 118 can compare the number or percentage (as applicable) of nodes of the set of nodes (e.g., 104, 106, 108, 110, 112) that have an upgrade status that corresponds to (e.g., matches or is the same as) the defined upgrade status (e.g., the applicable upgrade status) to the defined threshold value (e.g., defined threshold number or percentage, as applicable). Based at least in part on the results of the comparison, the CMC 118 can determine whether the number or percentage of nodes of the set of nodes that have an upgrade status that corresponds to the defined upgrade status satisfies the defined threshold value.

When the CMC 118 is determining whether the defined threshold value has been satisfied, there can be instances where one or more nodes of the set of nodes can be unavailable for a number of reasons, such as, for example, a node is being used already and is unable (unable or unavailable at the time) to accept another connection to a client device, a node is unavailable (at the time) due to the node undergoing an upgrade during the NDU (e.g., as more fully described herein), a node is unavailable (at the time) due to the node undergoing repair or maintenance, or a node is otherwise unavailable for another reason. In some embodiments, when determining whether the number or percentage of nodes of the set of nodes that have an upgrade status that corresponds to the defined upgrade status satisfies the defined threshold value, the CMC 118 can consider only the nodes of the set that are determined to be available for use, and can disregard any unavailable node in the set or remove any unavailable node from the set. For instance, the CMC 118 can compare the number or percentage (as applicable) of available nodes of the set of available nodes that have an upgrade status that corresponds to the defined upgrade status to the defined threshold value, and can determine whether the defined threshold value is satisfied based at least in part on the results of such comparison. In other embodiments, when determining whether the number or percentage of nodes of the set of nodes that have an upgrade status that corresponds to the defined upgrade status satisfies the defined threshold value, the CMC 118 can consider all of the nodes of the set of nodes regardless of the availability of any node of the set.

If the CMC 118 determines that the defined threshold value is satisfied (e.g., met or exceeded) for the set of nodes (e.g., 104, 106, 108, 110, 112), the CMC can determine that the set of nodes can be reduced to a subset of nodes associated with the defined upgrade status, and can reduce the set of nodes to the subset of nodes. For instance, the CMC can form a subset of nodes from the set of nodes, wherein the node or nodes of the subset of nodes each can have the particular type of upgrade status (e.g., either upgraded or updated status, or, alternatively, non-upgraded or non-updated status) corresponding to the defined upgrade status under consideration (e.g., being applied or implemented), and wherein the remaining nodes of the set of nodes that are not in the subset can have a different type of upgrade status than the defined upgrade status.

As an example, if the defined upgrade status is upgraded, and the defined threshold value is the number two, and if, during the NDU, the CMC 118 determines that two nodes, in particular, node 104 and node 106, of the set of nodes have been upgraded, and the other nodes (e.g., 108, 110, 112) of the set of nodes have not been upgraded, the CMC 118 can determine that the defined threshold value is satisfied and can reduce the set of nodes to a subset of nodes comprising node 104 and node 106 (e.g., can form a subset of nodes comprising node 104 and node 106). In determining which node to utilize to service the client request, the CMC 118 can consider the nodes (e.g., upgraded or updated nodes 104 and 106) in the subset and will not consider the other nodes (e.g., non-upgraded or non-updated nodes 108, 110, and 112) that are not in the subset of nodes.

As another example, if the defined upgrade status is upgraded, and the defined threshold value is the number two, and if, during the NDU, the CMC 118 determines that one node, in particular, node 104, of the set of nodes has been upgraded, and the other nodes (e.g., 106, 108, 110, 112) of the set of nodes have not been upgraded, the CMC 118 can determine that the defined threshold value is not satisfied and will not reduce the set of nodes to a subset of nodes comprising node 104. In determining which node to utilize to service the client request, the CMC 118 can consider all (e.g., all available nodes) of the nodes (e.g., 104, 106, 108, 110, 112) of the set of nodes (e.g., all nodes of the set, except for any node that has been taken offline, for example, to upgrade such node).

As still another example, if the defined upgrade status is non-upgraded, and the defined threshold number is two, and if, during the NDU, the CMC 118 determines that three nodes, in particular, node 104, node 106, and node 108, of the set of nodes are non-upgraded, and the other nodes (e.g., 110 and 112) of the set of nodes have been upgraded, the CMC 118 can determine that the defined threshold value is satisfied and can reduce the set of nodes to a subset of nodes comprising node 104, node 106, and node 108 (e.g., can form a subset of nodes comprising node 104, node 106, and node 108). In determining which node to utilize to service the client request, the CMC 118 can consider the nodes (e.g., non-upgraded nodes 104, 106, and 108) in the subset of nodes and will not consider the other nodes (e.g., upgraded nodes 110 and 112) that are not in the subset of nodes.

As yet another example, if the defined upgrade status is non-upgraded, and the defined threshold value is the number three, and if, during the NDU, the CMC 118 determines that two nodes, in particular, node 104 and node 106, of the set of nodes have not been upgraded, and the other nodes (e.g., 108, 110, and 112) of the set of nodes have been upgraded, the CMC 118 can determine that the defined threshold value is not satisfied and will not reduce the set of nodes to a subset of nodes comprising nodes 104 and 106. In determining which node to utilize to service the client request, the CMC 118 can consider all of the nodes (e.g., 104, 106, 108, 110, 112) of the set of nodes (e.g., all available nodes of the set of nodes).

If the defined threshold value has been satisfied, with regard to a subset of nodes under consideration, the CMC 118 can determine a node of the subset of nodes (e.g., can resolve the node of the subset of nodes) to utilize to connect to the client device 116 and service the client request based at least in part on the results of analyzing the statistical information regarding a node characteristic associated with the nodes of the subset and a second connection management criterion of the defined connection management criteria. The second connection management criterion can relate to (e.g., can facilitate implementation of) the connection policy and can indicate the node characteristic (e.g., node attribute or node property) to be considered by the CMC 118 and how the second connection management criterion can be satisfied with respect to the node characteristic. The node characteristic can relate to resource (e.g., CPU or other type of resource) usage associated with a node, throughput (e.g., network throughput or aggregate network throughput) associated with a node, a connection count of a node, an order of a node in a round-robin ordering of nodes (e.g., subset of nodes), or another desired node characteristic. The connection count can be a number of connections or connection sessions associated with a node.

For example, as part of the analysis of the statistical information, if the node characteristic under consideration is resource usage, the CMC 118 can determine the respective resource usages of the respective nodes (e.g., nodes 104 and 106) of the subset of nodes, and can determine which node (e.g., node 104) has the lowest amount (e.g., lowest level) of resource usage as compared to the other node(s) (e.g., node 106) of the subset of nodes, based at least in part on the results of the analysis of the statistical information relating to resource usage. If the node characteristic under consideration is throughput, the CMC 118 can determine the respective throughputs of the respective nodes (e.g., nodes 104 and 106) of the subset of nodes, and can determine which node (e.g., node 106) has the highest throughput level as compared to the other node(s) (e.g., node 104) of the subset of nodes, based at least in part on the results of the analysis of the statistical information relating to throughput. If the node characteristic under consideration is connection count, the CMC 118 can determine the respective connection counts of the respective nodes (e.g., nodes 104 and 106) of the subset of nodes, and can determine which node (e.g., node 104) has the lowest connection count as compared to the other node(s) (e.g., node 106) of the subset of nodes, based at least in part on the results of the analysis of the statistical information relating to connection count. If the node characteristic under consideration is round-robin ordering, the CMC 118 can determine the respective order of the respective nodes (e.g., nodes 104 and 106) of the subset of nodes in the round-robin order, and can determine which node (e.g., node 106) is next in order (e.g., next in line, or in the next slot) in the round-robin ordering as compared to the other node(s) (e.g., node 104) of the subset of nodes, based at least in part on the results of the analysis of the statistical information relating to round-robin ordering.

Based at least in part on the results of the analysis of the statistical information regarding the node characteristic, the CMC 118 can determine the node of the subset of nodes that satisfies the second connection management criterion with regard to the node characteristic under consideration. For instance, depending on the node characteristic under consideration, in accordance with the second connection management criterion, the CMC 118 can determine that the node (e.g., node 104) that has the lowest amount of resource usage as compared to the other node(s) (e.g., node 106) of the subset of nodes is to be selected to service the client request; can determine that the node (e.g., node 106) that has the highest throughput as compared to the other node(s) (e.g., node 104) of the subset of nodes is to be selected to service the client request; can determine that the node (e.g., node 104) that has the lowest connection count as compared to the other node(s) (e.g., node 106) of the subset of nodes is to be selected to service the client request; or can determine that the node (e.g., node 106) that is next in order in the round-robin ordering as compared to the other node(s) (e.g., node 104) of the subset of nodes is to be selected to service the client request.

Upon determining the node (e.g., node 104, or node 106, or whichever node is determined to satisfy the second connection management criterion) to select to service the client request, the CMC 118 can connect or facilitate connecting the node to the client device 116. In some embodiments, in connection with determining the node to select, the CMC 118 can determine or identify an IP address (e.g., virtual IP address) of a set of IP addresses associated with the node, and such IP address can be utilized to facilitate connecting the node to the client device 116. In response to being connected to the client device 116, the node can perform desired operations to service the client request.

Referring again to the analysis associated with the first connection management criterion, if, instead, the CMC 118 determines that the defined threshold value is not satisfied (e.g., the first connection management criterion is not satisfied), the CMC 118 can determine that the set of nodes (e.g., 104, 106, 108, 110, 112) is not to be reduced and all of the nodes (e.g., all available nodes) in the set of nodes can be considered when determining which node to select to service the client request. In such instance, the CMC 118 can determine a node (e.g., 104, 106, 108, 110, or 112) from the set of nodes (e.g., can resolve the node of the set of nodes) based at least in part on the results of analyzing the statistical information relating to the node characteristic under consideration and the second connection management criterion, in a same or similar manner as the CMC 118 can determine a node from a subset of nodes associated with the defined upgrade status, except that all of the nodes (e.g., all available nodes) in the set of nodes can be considered instead of only some (e.g., a subset) of the nodes being considered.

Upon determining the node (e.g., whichever node (e.g., 104, 106, 108, 110, or 112) of the set of nodes is determined to satisfy the second connection management criterion) to select to service the client request, the CMC 118 can connect or facilitate connecting such node to the client device 116. In response to being connected to the client device 116, the node can perform desired operations to service the client request.

In other embodiments, during an NDU, in response to receiving a client request, the CMC 118 can consider all of the nodes (e.g., all available nodes) of the set of nodes (e.g., 104, 106, 108, 110, 112), without determining whether to reduce the set of nodes to consider only a subset of nodes (e.g., when this is in accordance with the defined connection management criteria). In such embodiments, the CMC 118 can determine a node (e.g., 104, 106, 108, 110, or 112) of the set of nodes (e.g., 104, 106, 108, 110, 112) to utilize to connect to the client device 116 and service the client request based at least in part on the results of analyzing statistical information regarding a node characteristic under consideration and the second connection management criterion. Such determination of the node from the set of nodes can be performed in a same or similar manner as the CMC 118 can determine a node from a subset of nodes associated with the defined upgrade status, except that all of the nodes (e.g., all available nodes) in the set of nodes can be considered instead of only some (e.g., a subset) of the nodes being considered.

Upon determining the node (e.g., whichever node (e.g., 104, 106, 108, 110, or 112) of the set of nodes is determined to satisfy the second connection management criterion) to select to service the client request, the CMC 118 can connect or facilitate connecting such node to the client device 116. In response to being connected to the client device 116, the node can perform desired operations to service the client request.

In certain embodiments, if there is no upgrade being performed on the nodes (e.g., 104, 106, 108, 110, or 112), in response to receiving a client request, the CMC 118 can consider all of the nodes (e.g., all available nodes) of the set of nodes (e.g., 104, 106, 108, 110, 112), regardless of (e.g., irrespective of) the respective software or firmware versions of the respective nodes of the set, and without determining whether to reduce the set of nodes to consider only a subset of nodes (e.g., when this is in accordance with the defined connection management criteria). In such embodiments, the CMC 118 can determine a node (e.g., 104, 106, 108, 110, or 112) of the set of nodes (e.g., 104, 106, 108, 110, 112) to utilize to connect to the client device 116 and service the client request based at least in part on the results of analyzing statistical information regarding a node characteristic under consideration and the second connection management criterion. Such determination of the node from the set of nodes can be performed in a same or similar manner as the CMC 118 can determine a node from a subset of nodes associated with the defined upgrade status, except that all of the nodes (e.g., all available nodes) in the set of nodes can be considered instead of only some (e.g., a subset) of the nodes being considered.

Upon determining the node (e.g., whichever node (e.g., 104, 106, 108, 110, or 112) of the set of nodes is determined to satisfy the second connection management criterion) to select to service the client request, the CMC 118 can connect or facilitate connecting such node to the client device 116. In response to being connected to the client device 116, the node can perform desired operations to service the client request.

During an NDU, when the update component 114 is performing an update on a node (e.g., 104, 106, 108, 110, or 112) upgrade that node to a current or newer version of software or firmware, that node can be taken offline. During the update, the node can still be at the lower or same version of software or firmware as it was prior to initiation of the update, since the update (e.g., upgrade) of software or firmware is not yet completed. Accordingly, when a node (e.g., node 104) is offline for it to be updated, the CMC 118 can detect or determine that the node is offline and can remove that offline node from consideration with regard to servicing the client request either at an initial stage (e.g., when determining whether to reduce a set of nodes to a subset of nodes associated with the defined upgrade status, in accordance with the first connection management criterion) or at a subsequent stage (e.g., when determining a node of a subset of nodes (or a set of nodes) to select to service the client request, in accordance with the second connection management criterion). In some embodiments, when a node (e.g., node 104) is offline during an update, the node, the update component 114, or another component of the storage system 102 can communicate a notification indicator or message (e.g., offline indicator or error indicator) to the CMC 118 to notify the CMC 118 that the node is offline and being updated. For example, when a node (e.g., node 104) is offline to be updated, the update component 114, the node being updated, or another component of the storage system 102 can set the upgrade status of the node to "error" or another desired value, flag, or message, which can indicate to the CMC 118 that such node is offline and being updated (or an upgrade of the node was not successful or has not yet been successful), and the CMC 118 can consider such node to be a non-upgraded node and/or can remove that node from consideration with regard to servicing the client request. In other embodiments, the CMC 118 can detect or determine that such node is offline and being updated based at least in part on the interaction of the CMC 118 with the interaction with such node indicating to the CMC 118 that the node is offline and being updated.

Figure 2:
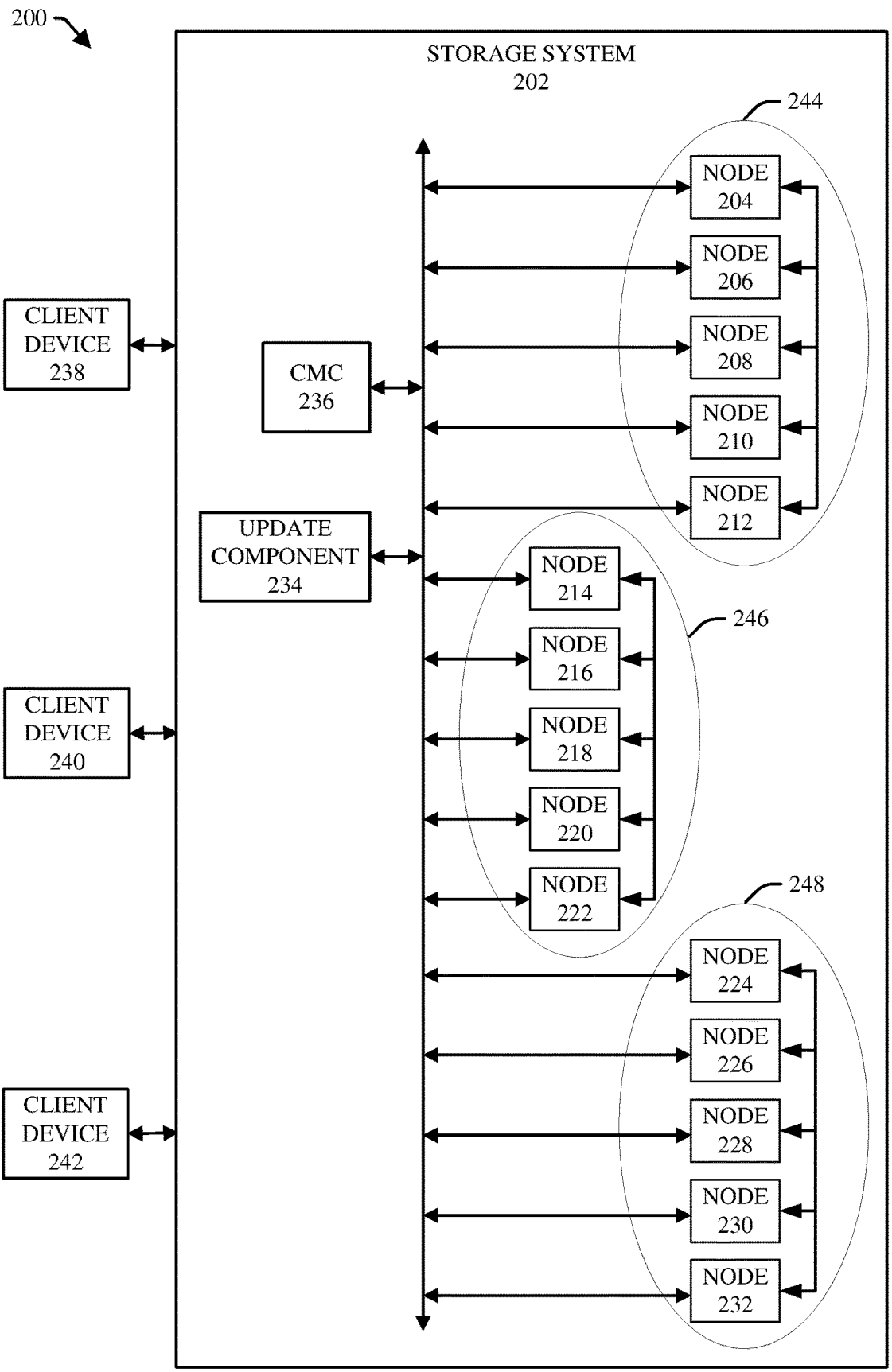
FIG. 2 depicts a block diagram of an example system that can desirably determine a node to utilize to service a client request, based at least in part on upgrade statuses of nodes, with respect to an applicable upgrade status connection management criterion, for one or more clusters of nodes, in accordance with various aspects and embodiments of the disclosed subject matter.

Referring to FIG. 2 (along with FIG. 1), FIG. 2 depicts a block diagram of an example system 200 that can desirably (e.g., efficiently, suitably, or optimally) determine a node to utilize to service a client request, based at least in part on upgrade statuses of nodes, with respect to an applicable upgrade status connection management criterion, for one or more clusters of nodes, in accordance with various aspects and embodiments of the disclosed subject matter. The system 200 can comprise a storage system 202 that can include a desired number of nodes that can be employed to service client requests from clients with regard to storing, retrieving, and processing of files or data being written to, read from, or stored in the storage system 202.

The storage system 202 can comprise a plurality of nodes comprising, for example, node 204, node 206, node 208, node 210, node 212, node 214, node 216, node 218, node 220, node 222, node 224, node 226, node 228, node 230, and node 232. It is to be appreciated and understood that, in accordance with various embodiments, the storage system 202 can comprise fifteen nodes (as depicted in FIG. 2), less than fifteen nodes or more than fifteen nodes, and the storage system 202 can be scalable to add or remove nodes, as desired. The storage system 202 also can include an update component 234, a CMC 236, and client devices, such as client device 238, client device 240, and client device 242, that can be associated with respective clients. The storage system 202, nodes 204 through 232, update component 234, CMC 236, and client devices (e.g., client devices 238, 240, and 242), each, respectively, can be the same as or similar to, and/or can comprise the same or similar respective functionality as, respective components (e.g., respectively named components), such as more fully described herein.

In some embodiments, the storage system 202 can comprise a desired number of clusters of nodes, such as cluster 244, cluster 246, and cluster 248, that each can comprise one or more nodes (e.g., one or more nodes of the plurality of nodes, comprising nodes 204 through 232). For example, cluster 244 can comprise node 204, node 206, node 208, node 210, and node 212; cluster 246 can comprise node 214, node 216, node 218, node 220, and node 222; and cluster 248 can comprise node 224, node 226, node 228, node 230, and node 232. It is to be appreciated and understood that a cluster (e.g., 244, 246, or 248) can comprise five nodes (as depicted in FIG. 2), less than five nodes, or more than five nodes, respective clusters can have respective (e.g., different or same) numbers of nodes, and the clusters can be scalable to add or remove nodes, as desired.

During an NDU, the update component 234 can update (e.g., upgrade) the software or firmware of the nodes on an individual basis, as more fully described herein. During the NDU, the storage system 202 can receive one or more client requests from one or more of the client devices (e.g., client devices 238, 240, or 242), at one or more times.

The CMC 236 can manage connections between client devices (e.g., client devices 238, 240, and/or 242) of clients and the nodes (e.g., nodes 204 through 232, respectively) of the storage system 202, in accordance with the defined connection management criteria. For instance, during an NDU, the CMC 236 can manage connections of client devices associated with clients to nodes based at least in part on the first connection management criterion relating to the node pool policy to determine nodes (e.g., subset of nodes, or set of nodes) to consider for connection for a client request and the second communication management criterion relating to the connection policy, which can be implemented to facilitate determining which node of a subset of the set of nodes (or which node of the set of nodes) is to be selected to service the client request, in accordance with the defined connection management criteria.

In some embodiments, in response to a client request received from a client device (e.g., client device 238), the CMC 236 can determine whether to reduce a set of nodes to a subset of nodes having a particular upgrade status (e.g., upgraded status, or, alternatively, non-upgraded status) based at least in part on the results of analyzing statistical information relating to the respective upgrade statuses of respective nodes of the set of nodes and the first connection management criterion, which can indicate a defined upgrade status (e.g., the type of upgrade status, which can be upgraded status, or, alternatively, non-upgraded status), if any, under consideration and a defined threshold value (e.g., defined threshold number or percentage) associated with the defined upgrade status. In determining the set of nodes to consider and whether the defined threshold value is satisfied with regard to the set of nodes, in certain embodiments, the CMC 236 can determine the set of nodes on a per cluster basis, wherein, for example, the CMC 236 can treat the nodes (e.g., node 204, node 206, node 208, node 210, and node 212) of a cluster (e.g., cluster 244) as a set of nodes (e.g., with respect to a client request received from client device 238). If the set of nodes of the cluster (e.g., cluster 244) satisfies the defined threshold value, the CMC 236 can determine that the set of nodes can be reduced to a subset of nodes that comprises nodes having the particular upgrade status that corresponds to the defined upgrade status, even if the nodes of cluster 246 and/or nodes of cluster 248 do not satisfy the defined threshold value, or even if when all of the nodes of clusters 244, 246, and 248 are considered together, the defined threshold value is not satisfied with regard to all nodes of all the clusters combined.

In some embodiments, when determining whether the number or percentage of nodes of the set of nodes that have an upgrade status that corresponds to the defined upgrade status satisfies the defined threshold value, the CMC 236 can consider only the nodes of the set of nodes (e.g., a cluster of nodes) that are determined to be available for use, and can disregard any unavailable node in the set or remove any unavailable node from the set, as more fully described herein. In other embodiments, when determining whether the number or percentage of nodes of the set of nodes that have an upgrade status that corresponds to the defined upgrade status satisfies the defined threshold value, the CMC 236 can consider all of the nodes of the set of nodes regardless of the availability of any node of the set.

If the defined threshold value is determined to have been satisfied, with regard to a subset of nodes under consideration, the CMC 236 can determine a node of the subset of nodes to utilize to connect to the client device (e.g., client device 238) and service the client request based at least in part on the results of analyzing the statistical information regarding a node characteristic associated with the nodes of the subset and the second connection management criterion, as more fully described herein. The second connection management criterion can indicate the node characteristic (e.g., node attribute or node property) to be considered by the CMC 236 and how the second connection management criterion can be satisfied with respect to the node characteristic. The node characteristic can relate to resource usage associated with a node, throughput associated with a node, a connection count of a node, an order of a node in a round-robin ordering of nodes (e.g., subset of nodes), or another desired node characteristic, as more fully described herein.

Upon determining the node (e.g., whichever node of the subset that is determined to satisfy the second connection management criterion) to select to service the client request, the CMC 236 can connect or facilitate connecting the node to the client device (e.g., client device 238). In response to being connected to the client device, the node can perform desired operations to service the client request.

If, instead, the CMC 236 determines that the defined threshold value is not satisfied (e.g., the first connection management criterion is not satisfied) with regard to a set of nodes (e.g., nodes 204, 206, 208, 210, and 212) of a cluster (e.g., cluster 244), the CMC 236 can determine that the set of nodes is not to be reduced and all of the nodes (e.g., all available nodes) in the set of nodes (e.g., nodes of cluster 244) can be considered when determining which node to select to service the client request. In such instance, the CMC 236 can determine a node (e.g., 204, 206, 208, 210, or 212) from the set of nodes based at least in part on the results of analyzing the statistical information relating to the node characteristic under consideration and the second connection management criterion, in a same or similar manner as the CMC 236 can determine a node from a subset of nodes associated with the defined upgrade status, except that all of the nodes (e.g., all available nodes) in the set of nodes can be considered instead of only some (e.g., a subset) of the nodes being considered.

Upon determining the node (e.g., whichever node of the set of nodes that is determined to satisfy the second connection management criterion) to select to service the client request, the CMC 236 can connect or facilitate connecting such node to the client device (e.g., client device 238). In response to being connected to the client device, the node can perform desired operations to service the client request.

Figure 3:
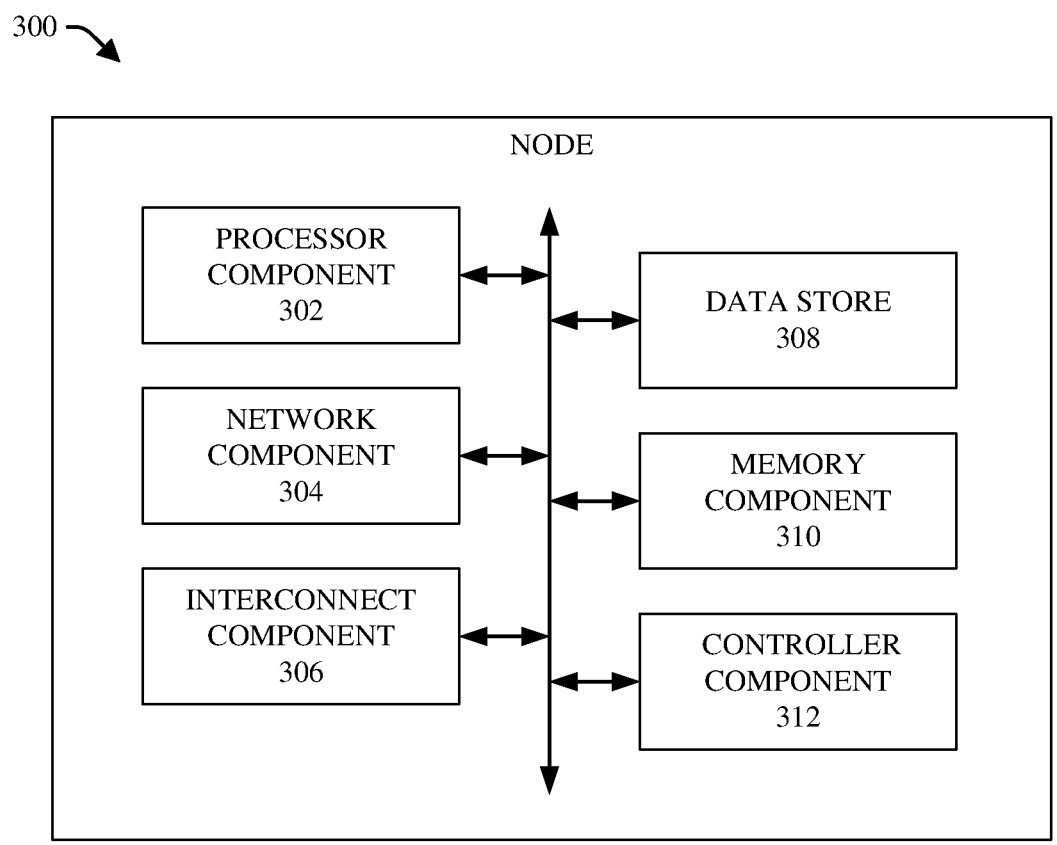
FIG. 3 illustrates a block diagram of an example node that can be employed to service client requests of clients, in accordance with various aspects and embodiments of the disclosed subject matter.

Referring to FIG. 3 (along with FIG. 1), FIG. 3 illustrates a block diagram of an example node 300 that can be employed to service client requests of clients, in accordance with various aspects and embodiments of the disclosed subject matter. The node 300 can comprise various components, including a processor component 302, a network component 304, an interconnect component 306, a data store 308, a memory component 310, a controller component 312, and/or other desired components.

The processor component 302 can include can work in conjunction with the other components (e.g., network component 304, interconnect component 306, data store 308, memory component 310, controller component 312, . . . ) to facilitate performing the various functions of the node 300. The processor component 302 can employ one or more processors (e.g., one or more CPUs), microprocessors, or controllers that can process data, such as information relating to files, file systems, communication connection operations, read operations, write operations, data storage operations, data or file search operations, networking of nodes, queries, metadata, parameters, traffic flows, policies, algorithms (e.g., data management algorithms, hash algorithms, compression algorithms, decompression algorithms), protocols, interfaces, tools, and/or other information, to facilitate operation of the node 300, and control data flow between the node 300 and other components (e.g., another node(s), CMC, update component, client device, file system, . . . ) associated with the node 300.

The network component 304 can comprise network sub-components (e.g., Ethernet component (e.g., Ethernet ports and associated Ethernet sub-components), wireless communication connection component, . . . ) that can enable the node 300 to network and communicate with one or more other nodes (e.g., nodes of a cluster of nodes), the CMC, client devices, and/or other components or devices. The network can employ IP for node-to-node communication between the node 300 and other nodes (e.g., other nodes of the cluster of nodes) associated with the node 300. For instance, a cluster of nodes of the storage system can comprise a back-end network, which can act as a backplane for the node cluster, wherein can enable isolating node-to-node communication (e.g., between the node 300 and other nodes of the cluster) to a private, high-speed, low-latency network. The network component 304 can support and utilize desired network communication protocols to communicate with other components or devices in a communication network (e.g., Internet, intranet, customer network, . . . ), wherein the network communication protocols can comprise, for example, network file system (NFS), server message block (SMB), hypertext transfer protocol (HTTP), file transfer protocol (FTP), Hadoop distributed file system (HDFS), OpenStack Swift, and/or other desired network communication protocols. The network component 304 also can comprise IP functionality that can allow the network component 304 and associated storage system to utilize communication protocols, such as IPv4 and IPv6, and be fully integrated with IPv4 and IPv6 environments. The node 300 can be associated with (e.g., assigned) respective IP addresses, including virtual IP addresses, that can be employed to facilitate enabling the node 300 to connect to client devices, other nodes, and/or other components or devices. If the node 300 is offline for any reason, the IP addresses (e.g., virtual IP addresses) of the node 300 can be migrated (e.g., moved or transferred) to another node of the cluster to facilitate redistributing client devices of clients to other nodes of the cluster if the node 300 is offline.

The interconnect component 306 can be associated with the network component 304 and/or other components to facilitate providing desired interconnects to the network component 304 and/or the other components. For instance, in some embodiments, a portion of the interconnect component 306 can be part of the network component 304. The interconnect component 306 can comprise various types of interconnects (e.g., interconnect sub-components) that can be utilized to connect the node 300 to other nodes of the cluster of nodes, connect various components (e.g., processor component 302, data store 308, memory component 310, . . . ) of the node 300, or connection the node 300 to other components (e.g., CMC, update component, . . . ) of the storage system. The interconnects can comprise, for example, Ethernet interconnects or other low-latency interconnects (e.g., low-latency InfiniBand interconnects) that can be utilized to provide desirably fast and low-latency connections between respective components of or associated with the node 300. For instance, the memory component 310 (e.g., memory cache of the memory component 310) can communicate via a desirably fast (e.g., low-latency) interconnect (e.g., internal interconnect) of the interconnect component 306 to another memory component(s) of another node(s) of the cluster of nodes to desirably communicate or otherwise make available the data in the memory component 310 to the other memory component(s) or to access data in the other memory component(s), wherein such interconnect can have a significantly lower latency than accessing a hard disk drive of a node. The interconnect component 306 also can comprise desirably fast interconnects between different memory sub-components (e.g., different caches) of the memory component 310.

The data store 308 can store data structures (e.g., user data, metadata), code structure(s) (e.g., modules, objects, hashes, classes, procedures) or instructions, information relating to files, file systems, communication connection operations, read operations, write operations, data storage operations, data or file search operations, networking of nodes, queries, metadata, parameters, traffic flows, policies, algorithms (e.g., data management algorithms, hash algorithms, compression algorithms, decompression algorithms), protocols, interfaces, tools, and/or other information, to facilitate controlling operations associated with the node 300. In an aspect, the processor component 302 can be functionally coupled (e.g., through a memory bus) to the data store 308 in order to store and retrieve information desired to operate and/or confer functionality, at least in part, to the network component 304, interconnect component 306, data store 308, memory component 310, controller component 312, etc., and/or substantially any other operational aspects of the node 300.

The memory component 310 can include one or more volatile or non-volatile memory sub-components (e.g., cache memory) that can be utilized to store data, such as the various types of data disclosed herein. The memory sub-components of the memory component 310 can comprise, for example, random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), and/or other desired type of memory. One or more memory sub-components can be one or more caches.

The controller component 312 can be or can comprise a disk controller that can enable the processor component 302, or portion thereof, to communicate with the data store 308 (e.g., a hard disk of the data store 308) or other type of storage media or storage drive (e.g., disk drive) of or associated with the node 300. The controller component 312 also can provide or facilitate providing an interface between the hard disk or disk drive and other components of the node 300.

Figure 4:
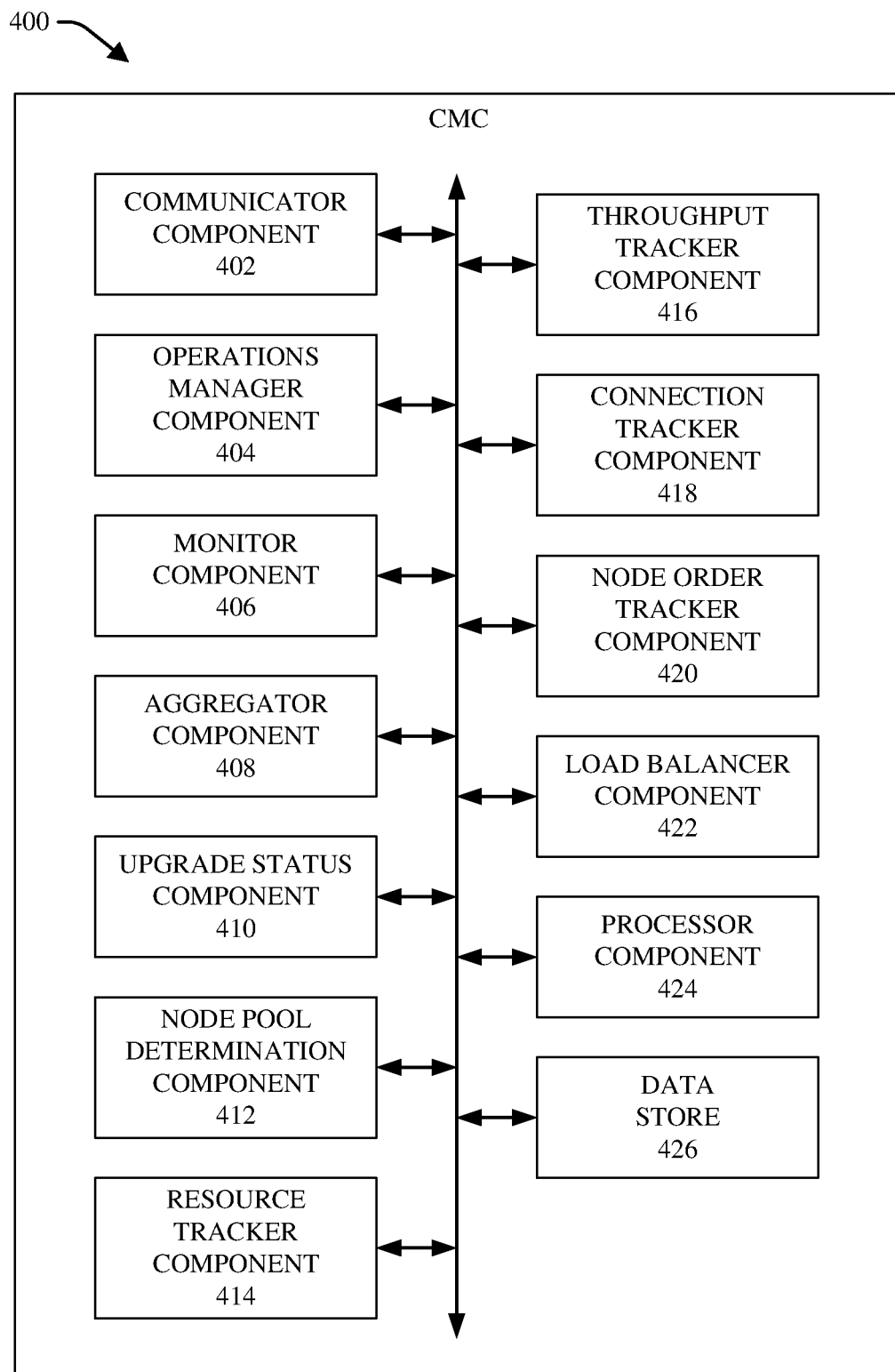
FIG. 4 depicts a block diagram of an example connection manager component, in accordance with various aspects and embodiments of the disclosed subject matter.

Turning to FIG. 4 (along with FIG. 1), FIG. 4 depicts a block diagram of an example CMC 400, in accordance with various aspects and embodiments of the disclosed subject matter. The CMC 400 can comprise, for example, a communicator component 402, an operations manager component 404, a monitor component 406, an aggregator component 408, an upgrade status component 410, a node pool determination component 412, a resource tracker component 414, a throughput tracker component 416, a connection tracker component 418, a node order tracker component 420, a load balancer component 422, a processor component 424, and a data store 426.

The communicator component 402 can transmit information from the CMC 400 to another component(s) (e.g., update component, node, . . . ), device(s) (e.g., client device), function(s), and/or user(s), and/or can receive information from the component(s), device(s), function(s), and/or user(s). For example, the communicator component 402 can receive statistical information (e.g., resource usage information, throughput information, connection information, . . . ) regarding nodes from the nodes or another component associated with the nodes. As another example, the communicator component 402 can transmit information (e.g., instructions, virtual IP address, . . . ) relating to connecting a node to a client device to the node and/or the client device.

The operations manager component 404 can control (e g, manage) operations associated with the CMC 400. For example, the operations manager component 404 can facilitate generating instructions to have components of the CMC 400 perform operations, and can communicate respective instructions to respective components (e.g., communicator component 402, monitor component 406, aggregator component 408, . . . , processor component 424, or data store 426) of the CMC 400 to facilitate performance of operations by the respective components of the CMC 400 based at least in part on the instructions, in accordance with the defined connection management criteria and connection management algorithm(s) (e.g., connection management algorithms as disclosed, defined, recited, or indicated herein by the methods, systems, and techniques described herein). The operations manager component 404 also can facilitate controlling data flow between the respective components of the CMC 400 and controlling data flow between the CMC 400 and another component(s) or device(s) (e.g., update component, nodes, client device, file system, . . . ) associated with (e.g., connected to) the CMC 400.

The monitor component 406 can monitor conditions associated with the nodes of the storage system. For instance, the monitor component 406 can monitor respective upgrades and upgrade statuses of nodes, respective availability of nodes, respective resource usage by nodes, respective throughput levels of nodes, respective connection counts of nodes, round-robin ordering of nodes, and/or other conditions or characteristics associated with the nodes. Based at least in part on the monitoring, the monitor component 406 can receive or generate statistical information relating to upgrades and upgrade statuses of nodes, respective availability of nodes, respective resource usage by nodes, respective throughput levels of nodes, respective connection counts of nodes, round-robin ordering of nodes, and/or other conditions or characteristics associated with the nodes.

The aggregator component 408 can aggregate data received (e.g., obtained) from various entities (e.g., nodes, update component, client devices, processor component 424, user interface(s), data store(s) (e.g., data store 426), etc.). The aggregator component 408 can correlate respective items of data based at least in part on type of data, source of the data, time or date the data was generated or received, etc., to facilitate processing of the data by other components of the CMC 400. For example, the aggregator component 408 can receive statistical information relating to the nodes (e.g., relating to the conditions associated with the nodes) from the monitor component 406, or another component or device, and can aggregate the statistical information and correlate the statistical information based at least in part on statistical information relating to upgraded statuses of nodes, statistical information relating to resource usage of nodes, statistical information relating to throughput levels of nodes, statistical information relating to connection counts of nodes, and/or statistical information relating to round-robin ordering of nodes.

The upgrade status component 410 can determine or identify the respective upgrade statuses of nodes of the storage system. For example, during an NDU, the upgrade status component 410 can track the upgrading of nodes, and can determine the respective upgrade statuses (e.g., upgraded, not upgraded, or currently undergoing an upgrade) of software or firmware of respective nodes based at least in part on the results of analyzing statistical information relating to upgrading of nodes. The upgrade status component 410 also can track upgrade statuses of nodes during disruptive upgrades of nodes.

The node pool determination component 412 can determine whether a set of nodes (e.g., set of available nodes) satisfies the first connection management criterion, including the associated defined threshold value (e.g., number or percentage) relating to a defined upgrade status (e.g., upgraded status, or, alternatively, non-upgraded status, as applicable) and the upgrade statuses of nodes, to facilitate determining whether a subset of nodes (e.g., subset of available nodes), comprising nodes (e.g., one or more nodes, depending on the defined threshold value) having an upgrade status that corresponds to the defined upgrade status, can be formed from the set of nodes (e.g., whether the set of nodes can be reduced to the subset of nodes). The node pool determination component 412 can analyze statistical information relating to the respective upgrade statuses of the respective nodes of the set of nodes. Based at least in part on the results of that analysis, the node pool determination component 412 can determine whether a sufficient number or percentage of nodes the set of nodes have an upgrade status that corresponds to the defined upgrade status to satisfy the defined threshold value relating to the defined upgrade status.

In response to determining that the defined threshold value is satisfied, the node pool determination component 412 can determine that the node pool (e.g., set of nodes) can be shrunk (e.g., reduced) to only those nodes that have an upgrade status that corresponds to the defined upgrade status, and can form a subset of nodes (e.g., subset of available nodes) comprising nodes that have such upgrade status that corresponds to the defined upgrade status. In response to determining that the defined threshold value is not satisfied, the node pool determination component 412 can determine that the set of nodes cannot be shrunk to only those nodes that have an upgrade status that corresponds to the defined upgrade status, and all nodes (e.g., all available nodes) of the set of nodes can be considered when determining which node to select to service a client request, regardless of the update status of the nodes.

The resource tracker component 414 can track the respective resource usage of respective nodes of the storage system. For instance, the resource tracker component 414 can analyze statistical information relating to the respective resource (e.g., CPU) usage of the respective nodes. Based at least in part on the results of the analysis, the resource tracker component 414 can determine respective amounts of resource usage of the respective nodes.

The throughput tracker component 416 can track respective throughput levels of respective nodes of the storage system. For example, the throughput tracker component 416 can analyze statistical information relating to the respective throughput levels of the respective nodes. Based at least in part on the analysis results, the throughput tracker component 416 can determine respective throughput levels of the respective nodes.

The connection tracker component 418 can track respective connection counts of respective nodes of the storage system. For instance, the connection tracker component 418 can analyze statistical information relating to the respective connection counts of the respective nodes. Based at least in part on the analysis results, the connection tracker component 418 can determine respective connection counts of the respective nodes.

The node order tracker component 420 can track the round-robin ordering of nodes of the storage system. For example, the node order tracker component 420 can analyze statistical information relating to the round-robin ordering of nodes. Based at least in part on the analysis results, the node order tracker component 420 can determine an ordering of the nodes in the round-robin ordering, including determining a next node in order in the round-robin ordering of nodes.

The load balancer component 422 can determine a node of a subset of nodes (e.g., subset of available nodes), or a node of a set of nodes (e.g., set of available nodes), as applicable, to utilize to service a client request based at least in part on the second connection management criterion relating to a desired node characteristic (e.g., node resource usage, node throughput, node connection count, or round-robin ordering of nodes). The nodes under consideration (e.g., a subset of nodes, or, alternatively, a set of nodes) by the load balancer component 422 can be determined by the node pool determination component 412 based at least in part on the first connection management criterion. Depending on the node characteristic under consideration, in accordance with the second connection management criterion, the load balancer component 422 can analyze statistical information relating to the node characteristic. Based at least in part on the analysis results and the second connection management criterion, the load balancer component 422 can determine the node of the subset, or set, as applicable, that can be utilized to service the client request. The CMC 400 can connect or facilitate connecting the node to the client device of the client.

The processor component 424 can work in conjunction with the other components (e.g., communicator component 402, monitor component 406, aggregator component 408, . . . , or data store 426) to facilitate performing the various functions of the CMC 400. The processor component 424 can employ one or more processors, microprocessors, or controllers that can process data, such as information relating to files, file systems, statistical information relating to conditions or characteristics associated with nodes, upgrade statuses of nodes, defined upgrade status, resource usage of nodes, throughput levels of nodes, connection counts of nodes, round-robin ordering of nodes, load balancing of a load with respect to nodes, metadata, client requests, queries, parameters, traffic flows, policies, defined connection management criteria, algorithms (e.g., connection management algorithms), protocols, interfaces, tools, and/or other information, to facilitate operation of the CMC 400, as more fully disclosed herein, and control data flow between the CMC 400 and other components (e.g., update component, nodes, client device, file system, . . . ) associated with the CMC 400.

The data store 426 can store data structures (e.g., user data, metadata), code structure(s) (e.g., modules, objects, hashes, classes, procedures) or instructions, information relating to files, file systems, statistical information relating to conditions or characteristics associated with nodes, upgrade statuses of nodes, defined upgrade status, resource usage of nodes, throughput levels of nodes, connection counts of nodes, round-robin ordering of nodes, load balancing of a load with respect to nodes, metadata, client requests, queries, parameters, traffic flows, policies, defined connection management criteria, algorithms (e.g., connection management algorithms), protocols, interfaces, tools, and/or other information, to facilitate controlling operations associated with the CMC 400. In an aspect, the processor component 424 can be functionally coupled (e.g., through a memory bus) to the data store 426 in order to store and retrieve information desired to operate and/or confer functionality, at least in part, to the communicator component 402, operations manager component 404, monitor component 406, aggregator component 408, upgrade status component 410, node pool determination component 412, resource tracker component 414, throughput tracker component 416, connection tracker component 418, node order tracker component 420, load balancer component 422, processor component 424, and data store 426, etc., and/or substantially any other operational aspects of the CMC 400.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 5:
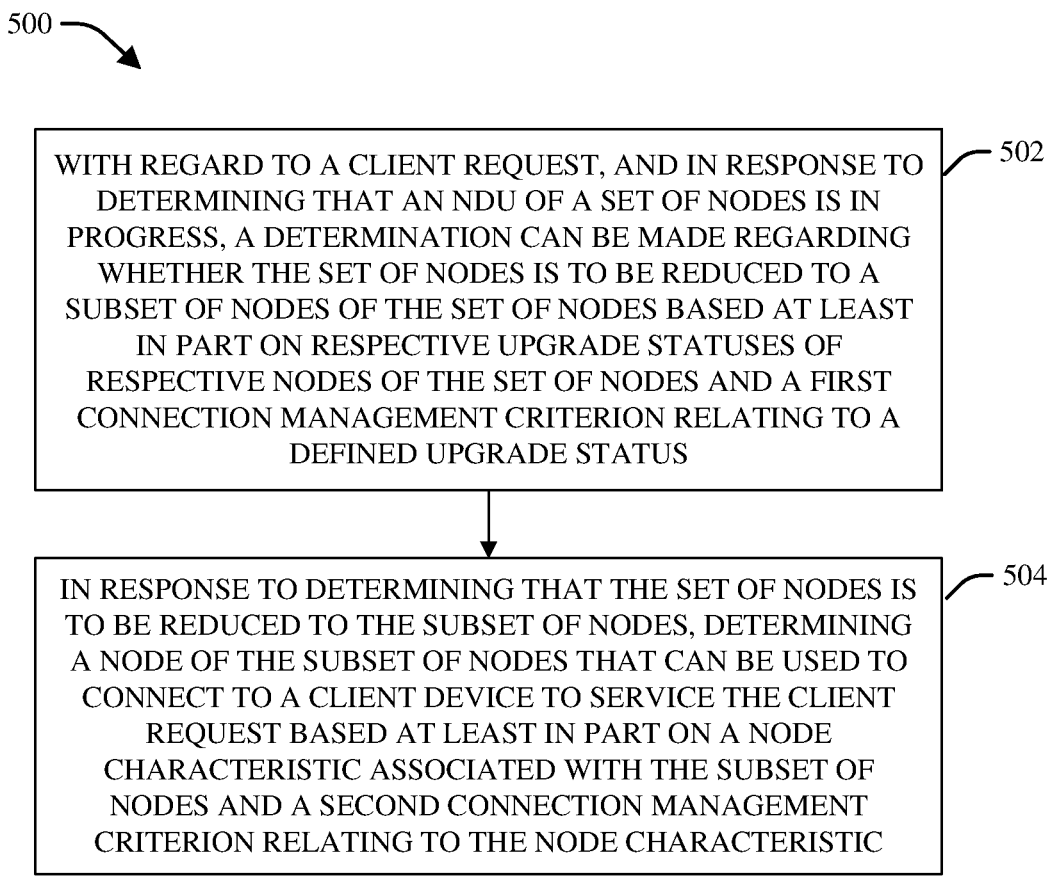
FIG. 5 illustrates a flow chart of an example method that can determine a node to utilize to service a client request based at least in part on the upgrade statuses of nodes of a set of nodes, in accordance with various aspects and embodiments of the disclosed subject matter.
Figure 6:
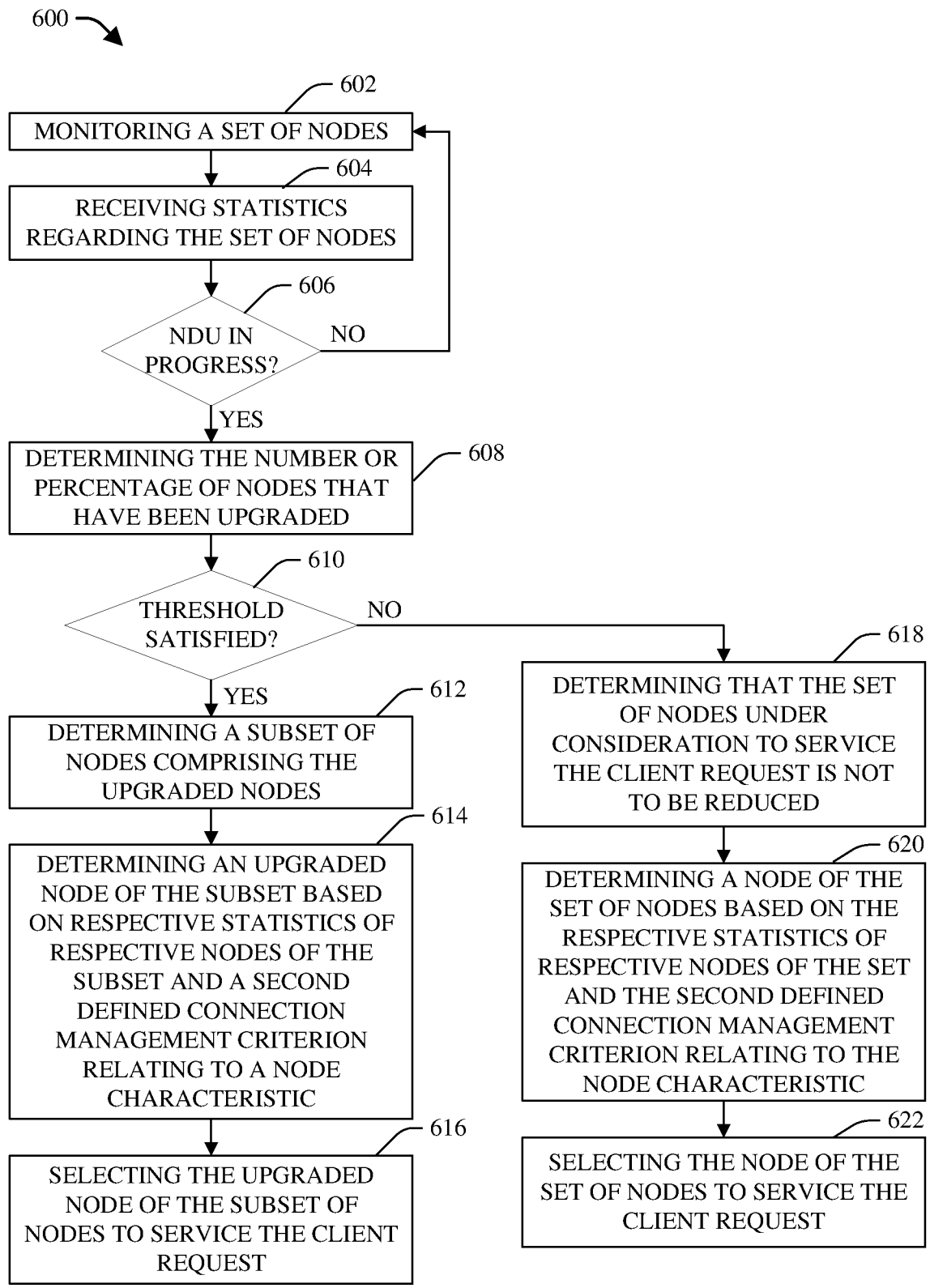
FIG. 6 presents a flow chart of an example method that can determine a node to utilize to service a client request, based at least in part on the upgrade statuses of nodes of a set of nodes, with respect to an upgraded status connection management criterion, in accordance with various aspects and embodiments of the disclosed subject matter.
Figure 7:
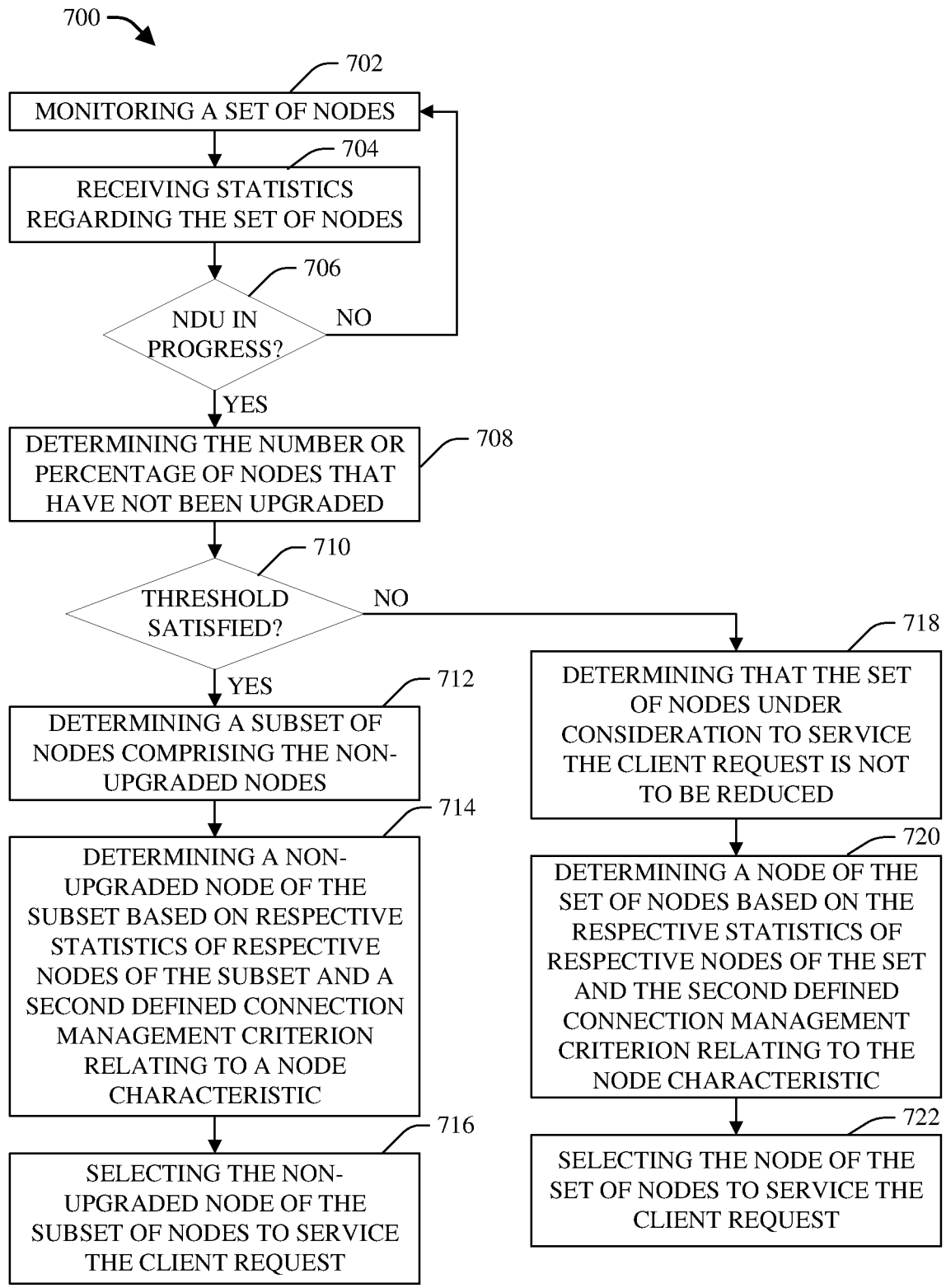
FIG. 7 illustrates a flow chart of an example method that can determine a node to utilize to service a client request, based at least in part on the upgrade statuses of nodes of a set of nodes, with respect to a non-upgraded status connection management criterion, in accordance with various aspects and embodiments of the disclosed subject matter.

In view of the example systems and/or devices described herein, example methods that can be implemented in accordance with the disclosed subject matter can be further appreciated with reference to flowcharts in FIGS. 5-7. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 5 illustrates a flow chart of an example method 500 that can determine a node to utilize to service a client request based at least in part on the upgrade statuses of nodes of a set of nodes, in accordance with various aspects and embodiments of the disclosed subject matter. The method 500 can be employed by, for example, a system comprising the CMC, a processor component (e.g., of or associated with the CMC), and/or data store (e.g., of or associated with the CMC and/or the processor component).

At 502, with regard to a client request, and in response to determining that an NDU of a set of nodes is in progress, a determination can be made regarding whether the set of nodes is to be reduced to a subset of nodes of the set of nodes based at least in part on respective upgrade statuses of respective nodes of the set of nodes and a first connection management criterion relating to a defined upgrade status. The CMC can detect or determine that an NDU is in progress (e.g., is being performed) on a set (e.g., group or pool) of nodes. In response to determining that the NDU of the set of nodes is in progress, the CMC can determine whether the set of nodes is to be reduced to a subset of nodes (e.g., subset of available nodes) based at least in part on the respective upgrade statuses of the respective nodes of the set of nodes and the first connection management criterion relating to the defined upgrade status. The first connection management criterion can indicate the defined threshold value relating to nodes (e.g., defined threshold number of nodes or defined threshold percentage of nodes) associated with the defined upgrade status that is to be applied to facilitate determining whether a subset of nodes associated with the defined upgrade status is to be formed from the set of nodes (e.g., facilitate determining whether the set of nodes is to be reduced to form a subset of nodes). The CMC can receive and analyze statistical information relating to the upgrade statuses of the respective nodes to facilitate determining the respective upgrade statuses of the respective nodes.

For instance, the CMC can determine the number or percentage of nodes of the set of nodes (e.g., set of available nodes) that are associated with the defined upgrade status. In some embodiments, the defined upgrade status can be a first type of upgrade status (e.g., an upgraded status) that can indicate a node has been upgraded (e.g., software and/or firmware of the node has been upgraded to a new (or newer) or current version of the software and/or firmware), in accordance with applicable connection management criteria (e.g., when applicable connection management criteria (e.g., applicable first connection management criterion of the criteria) specifies or indicates that the defined upgrade status can be the first type of upgrade status). In other embodiments, the defined upgrade status can be a second type of upgrade status (e.g., a non-upgraded status) that can indicate a node has been not yet been upgraded (e.g., software and/or firmware of the node has not yet been upgraded to a new (or newer) or current version of the software and/or firmware), in accordance with applicable connection management criteria (e.g., when applicable connection management criteria specifies or indicates that the defined upgrade status can be the second type of upgrade status).

If the CMC determines that the number or percentage of nodes of the set of nodes satisfies (e.g., meets or exceeds) the defined threshold value (e.g., number or percentage) relating to nodes associated with the defined upgrade status, the CMC can determine that the set (e.g., pool) of nodes can be reduced (e.g., shrunk) to the subset of nodes (e.g., subset of available nodes), which can include (e.g., only can include) the one or more nodes (depending in part on the defined threshold value), of the set of nodes, that is or are associated with the defined upgrade status (e.g., in some embodiments, upgraded status; or, in other embodiments, non-upgraded status). If, however, the CMC determines that the number or percentage of nodes of the set of nodes does not satisfy (e.g., meet or exceed) the defined threshold value (e.g., number or percentage) relating to nodes associated with the defined upgrade status, the CMC can determine that the set of nodes is not to be reduced to a subset of nodes, and can determine that the nodes in the set of nodes can be considered, regardless of the upgrade status of the nodes, for use in servicing the client request.

At 504, in response to determining that the set of nodes is to be reduced to the subset of nodes, a node of the subset of nodes that can be used to connect to a client device to service the client request can be determined based at least in part on a node characteristic associated with the subset of nodes and a second connection management criterion relating to the node characteristic. In response to determining that the set of nodes is to be reduced to the subset of nodes, the CMC can determine the node of the subset of nodes that can be used to connect to a client device to service a client request based at least in part on the node characteristic associated with the subset of nodes and the second connection management criterion relating to the node characteristic.

The desired node characteristic can relate to the amount (e.g., level of resource (e.g., CPU) utilization (e.g., resource load) of a node, a throughput (e.g., network throughput or aggregate network throughput) level of a node, a connection count of a node (e.g., a number of connections or connection sessions associated with the node), an ordering of the node (e.g., in a round robin ordering of nodes, wherein there can be a rotation of nodes), or another desired node characteristic. For example, the second applicable defined connection management criterion can relate to, indicate, or specify, determining the node of the subset of nodes that has the lowest or lower resource (e.g., CPU) utilization relative to the other nodes of the subset of nodes that are under consideration, determining a node of the subset of nodes that has the highest or higher throughput relative to other nodes of the subset of nodes, determining a node of the subset of nodes that has a lowest or lower number of connections relative to other nodes of the subset of nodes, or determining a node of the subset of nodes that is next in order in a round robin ordering of nodes (e.g., a next upgraded node in an ordering of upgraded nodes of the subset of nodes).

The CMC can collect and analyze node characteristics information (e.g., statistics relating to node characteristics) relating to the nodes (e.g., set of nodes), including the subset of nodes. The nodes characteristics information can comprise information regarding respective resource utilization of respective nodes, respective throughputs of the respective nodes, respective connection counts (e.g., numbers of connections) of the respective nodes, respective ordering of the respective nodes with regard to round robin ordering of nodes, or another desired type of node characteristic. Based at least in part on the results of analyzing the node characteristics information, or desired portion thereof, relating to the nodes of the subset of nodes and the second connection management criterion relating to the desired node characteristic, the CMC can determine the node of the subset of nodes that can be used to connect to the client device to service the client request. The CMC can connect or facilitate connecting the node with the client device associated with the client request. The node can perform desired operations to service the client request.

FIG. 6 presents a flow chart of an example method 600 that can determine a node to utilize to service a client request, based at least in part on the upgrade statuses of nodes of a set of nodes, with respect to an upgraded status connection management criterion, in accordance with various aspects and embodiments of the disclosed subject matter. The method 600 can be employed by, for example, a system comprising the CMC, a processor component (e.g., of or associated with the CMC), and/or data store (e.g., of or associated with the CMC and/or the processor component).

At 602, a set of nodes associated with a storage system can be monitored. At 604, statistics regarding the set of nodes can be received. The CMC can monitor the set of nodes associated with the storage system. In some embodiments, the set of nodes can be associated with a cluster. In other embodiments, the set of nodes can comprise all or a desired portion of nodes associated with multiple clusters of nodes. Based at least in part on such monitoring of the set of nodes, the CMC can receive (e.g., collect, obtain, or aggregate) statistics regarding the set of nodes. The statistics can relate to respective resource usage (e.g., CPU usage) of respective nodes of the set of nodes, respective throughputs of the respective nodes, respective client connections of the respective nodes, respective order positions (e.g., order slots) of the respective nodes in an ordering of nodes (e.g., round-robin ordering of nodes), respective update statuses of the respective nodes, and/or other desired statistics relating to the respective nodes.

At 606, based at least in part on the statistics regarding the respective update statuses of respective nodes of the set of nodes, a determination can be made regarding whether an NDU is in progress to update the set of nodes to a higher version of software or firmware. Based at least in part on an analysis of the statistics regarding the respective update statuses of the respective nodes, the CMC can determine whether an NDU is in progress to update the set of nodes to the higher version of software or firmware.

In response to determining that no NDU is in progress, the method 600 can return to reference numeral 602, wherein the method 600 can continue to monitor the nodes. If, at 606, it is determined that an NDU is in progress, at 608, the number or percentage of nodes of the set of nodes that have been upgraded can be determined. If the CMC determines that there is an NDU in progress, the CMC can determine the number or percentage of nodes of the set of nodes that have been upgraded.

At 610, a determination can be made regarding whether the number or percentage of nodes that have been upgraded satisfies an applicable defined threshold number or percentage of nodes, in accordance with a first defined connection management criterion. The CMC can determine whether the number or percentage of nodes of the set of nodes (e.g., set of available nodes) that have been upgraded (e.g., upgraded successfully) satisfies the applicable defined threshold number or percentage of nodes. The CMC can determine the applicable defined threshold (e.g., minimum threshold) number or percentage of nodes based at least in part the first defined connection management criterion of the defined connection management criteria, which can be or can comprise desired connection management policies and/or algorithms. For example, if there are 252 nodes in the set of nodes (e.g., a cluster of nodes, or an overall number of nodes of the clusters), the applicable defined threshold (e.g., minimum threshold) number (or percentage) of nodes can be 1 node (0.39% of the set of nodes), 51 nodes (20% of the set of nodes), 63 nodes (25% of the set of nodes), 76 nodes (30% of the set of nodes), or another desired number (or percentage) of nodes (e.g., greater or less than 51 nodes (or 20% of the set of nodes)), as indicated or specified by the defined connection management criteria.

In response to determining that the number or percentage of nodes that have been upgraded satisfies the applicable defined threshold number or percentage of nodes, at 612, a subset of nodes comprising the upgraded nodes can be determined. In response to determining that the number or percentage of nodes that have been upgraded satisfies the applicable defined threshold number or percentage of nodes, from the set of nodes, the CMC can determine the subset of nodes (e.g., subset of available nodes) that are upgraded nodes (e.g., successfully upgraded nodes). For example, the CMC can shrink (e.g., reduce) the pool of nodes to be considered for connecting to a client and servicing a client request to only those nodes that have been upgraded.

At 614, an upgraded node of the subset of nodes (e.g., subset of upgraded nodes) can be determined based at least in part on the respective statistics of respective nodes of the subset of nodes and a second defined connection management criterion relating to a node characteristic. The CMC can determine the upgraded node from the subset of nodes based at least in part on the respective statistics of respective nodes of the subset of nodes and the second applicable defined connection management criterion (e.g., defined connection policy) of the defined connection management criteria, wherein the second connection management criterion can relate to the node characteristic.

The respective statistics of the respective nodes can relate to the respective resource usage of respective nodes of the set of nodes, the respective throughputs of the respective nodes, the respective client connections of the respective nodes, respective order positions of the respective nodes in an ordering of nodes (e.g., round-robin ordering of nodes), and/or other desired statistics regarding the respective nodes. The second defined connection management criterion can relate to, indicate, or specify, for example, determining the node of the subset that has the lowest or lower resource (e.g., CPU) usage relative to the other nodes of the subset that are under consideration, determining a node of the subset that has the highest or higher throughput relative to other nodes of the subset, determining a node of the subset that has a lowest or lower number of connections as compared to the other nodes of the subset, and/or determining a node of the subset of nodes that is next in an ordering of the nodes of the subset (e.g., determining a next upgraded node in an ordering of upgraded nodes of the subset of nodes) in accordance with the round-robin ordering.

At 616, the upgraded node of the subset of nodes can be selected to service the client request (e.g., client connection request to connect to a node). The CMC can select the upgraded node from the subset of nodes to service the client request, wherein the upgraded node was determined based at least in part on the second defined connection management criterion and the respective statistics of the respective nodes. In response to selecting the upgraded node, the CMC can associate (e.g., communicatively connect) or facilitate associating the upgraded node with the client to enable the upgraded node to service the client request.

Referring again to reference numeral 610, if, at 610, it is determined that the number or percentage of nodes that have been upgraded does not satisfy the applicable defined threshold number or percentage of nodes, at 618, a determination can be made that the set of nodes under consideration to service the client request is not to be reduced. In response to determining that the number or percentage of nodes that have been upgraded does not satisfy the applicable defined threshold number or percentage of nodes, the CMC can determine that the set of nodes under consideration to service the client request is not to be reduced (e.g., not to be reduced to only consider the upgraded nodes).

At 620, a node of the set of nodes can be determined based at least in part on the respective statistics of respective nodes of the set of nodes and the second defined connection management criterion relating to the node characteristic. The CMC can determine the node from the set of nodes based at least in part on the respective statistics of the respective nodes of the set of nodes and the second defined connection management criterion (e.g., defined connection policy) relating to the node characteristic. The set of nodes can comprise nodes that have not yet been upgraded and nodes that have been upgraded.

At 622, the node of the set of nodes can be selected to service the client request. The CMC can select the node from the set of nodes to service the client request, wherein the node was determined based at least in part on the second applicable defined connection management criterion and the respective statistics of the respective nodes of the set of nodes. In response to selecting the node, the CMC can associate (e.g., communicatively connect) or facilitate associating the node with the client to enable the node to service the client request.

FIG. 7 illustrates a flow chart of an example method 700 that can determine a node to utilize to service a client request, based at least in part on the upgrade statuses of nodes of a set of nodes, with respect to a non-upgraded status connection management criterion, in accordance with various aspects and embodiments of the disclosed subject matter. The method 700 can be employed by, for example, a system comprising the CMC, a processor component (e.g., of or associated with the CMC), and/or data store (e.g., of or associated with the CMC and/or the processor component).

At 702, a set of nodes associated with a storage system can be monitored. At 704, statistics regarding the set of nodes can be received. The CMC can monitor the set of nodes associated with the storage system. In some embodiments, the set of nodes can be associated with a cluster. In other embodiments, the set of nodes can comprise all or a desired portion of nodes associated with multiple clusters of nodes. Based at least in part on such monitoring of the set of nodes, the CMC can receive (e.g., collect, obtain, or aggregate) statistics regarding the set of nodes, wherein the statistics can comprise statistics such as those statistics described herein.

At 706, based at least in part on the statistics regarding the respective update statuses of respective nodes of the set of nodes, a determination can be made regarding whether an NDU is in progress to update the set of nodes to a higher version of software or firmware. Based at least in part on an analysis of the statistics regarding the respective update statuses of the respective nodes, the CMC can determine whether an NDU is in progress to update the set of nodes to the higher version of software or firmware.

In response to determining that no NDU is in progress, the method 700 can return to reference numeral 702, wherein the method 700 can continue to monitor the nodes. If, at 706, it is determined that an NDU is in progress, at 708, the number or percentage of nodes of the set of nodes that have not been upgraded can be determined. If the CMC determines that there is an NDU in progress, the CMC can determine the number or percentage of nodes of the set of nodes that have not been upgraded (e.g., updated).

At 710, a determination can be made regarding whether the number or percentage of nodes that have not been upgraded satisfies an applicable defined threshold number or percentage of nodes, in accordance with a first defined connection management criterion. The CMC can determine whether the number or percentage of nodes of the set of nodes (e.g., set of available nodes) that have not been upgraded (e.g., non-upgraded nodes) satisfies the applicable defined threshold number or percentage of nodes. The CMC can determine the applicable defined threshold (e.g., minimum threshold) number or percentage of nodes based at least in part the first defined connection management criterion of the defined connection management criteria, which can be or can comprise desired connection management policies and/or algorithms.

In response to determining that the number or percentage of nodes that have not been upgraded satisfies the applicable defined threshold number or percentage of nodes, at 712, a subset of nodes comprising the non-upgraded nodes can be determined. If the CMC determines that the number or percentage of nodes that have not been upgraded satisfies the applicable defined threshold number or percentage of nodes, from the set of nodes, the CMC can determine the subset of nodes (e.g., subset of available nodes) that are non-upgraded nodes (e.g., nodes that have not been upgraded yet during the NDU). For example, the CMC can shrink (e.g., reduce) the pool of nodes to be considered for connecting to a client and servicing a client request to only those nodes that have not been upgraded during the NDU.

At 714, a non-upgraded node of the subset of nodes (e.g., subset of non-upgraded nodes) can be determined based at least in part on the respective statistics of respective nodes of the subset of nodes and/or a second defined connection management criterion relating to a node characteristic. The CMC can determine the non-upgraded node from the subset of nodes based at least in part on the respective statistics of respective nodes of the subset of nodes and/or the second defined connection management criterion (e.g., defined connection policy) of the defined connection management criteria. The respective statistics of the respective nodes that can be evaluated by the CMC can comprise one or more of the statistics (e.g., statistics regarding resource usage, throughput, connection count, or ordering of nodes in a round-robin ordering, . . . ), such as more fully described herein.

At 716, the non-upgraded node of the subset of nodes can be selected to service the client request (e.g., client connection request to connect to a node). The CMC can select the non-upgraded node from the subset of nodes to service the client request, wherein the CMC determined the non-upgraded node based at least in part on the second applicable defined connection management criterion and the respective statistics of the respective nodes. In response to selecting the non-upgraded node, the CMC can associate (e.g., communicatively connect) or facilitate associating the non-upgraded node with the client to enable the non-upgraded node to service the client request.

Referring again to reference numeral 710, if, at 710, it is determined that the number or percentage of nodes that have not been upgraded does not satisfy the applicable defined threshold number or percentage of nodes, at 718, a determination can be made that the set of nodes under consideration to service the client request is not to be reduced. In response to determining that the number or percentage of nodes that have not been upgraded does not satisfy the applicable defined threshold number or percentage of nodes, the CMC can determine that the set of nodes under consideration to service the client request is not to be reduced (e.g., not to be reduced to only consider the non-upgraded nodes), and all of the nodes (e.g., all available nodes) in the set of nodes can be considered in determining which node is to be used to service the client request.

At 720, a node of the set of nodes can be determined based at least in part on the respective statistics of respective nodes of the set of nodes and/or the second defined connection management criterion relating to the node characteristic. The CMC can determine the node from the set of nodes based at least in part on the respective statistics of the respective nodes of the set of nodes and/or the second defined connection management criterion (e.g., defined connection policy) relating to the node characteristic. The set of nodes can comprise nodes that have not yet been upgraded and nodes that have been upgraded.

At 722, the node of the set of nodes can be selected to service the client request. The CMC can select the node from the set of nodes to service the client request, in response to the CMC determining the node based at least in part on the second defined connection management criterion and the respective statistics of the respective nodes of the set of nodes. In response to selecting the node, the CMC can associate (e.g., communicatively connect) or facilitate associating the node with the client to enable the node to service the client request.

Figure 8:
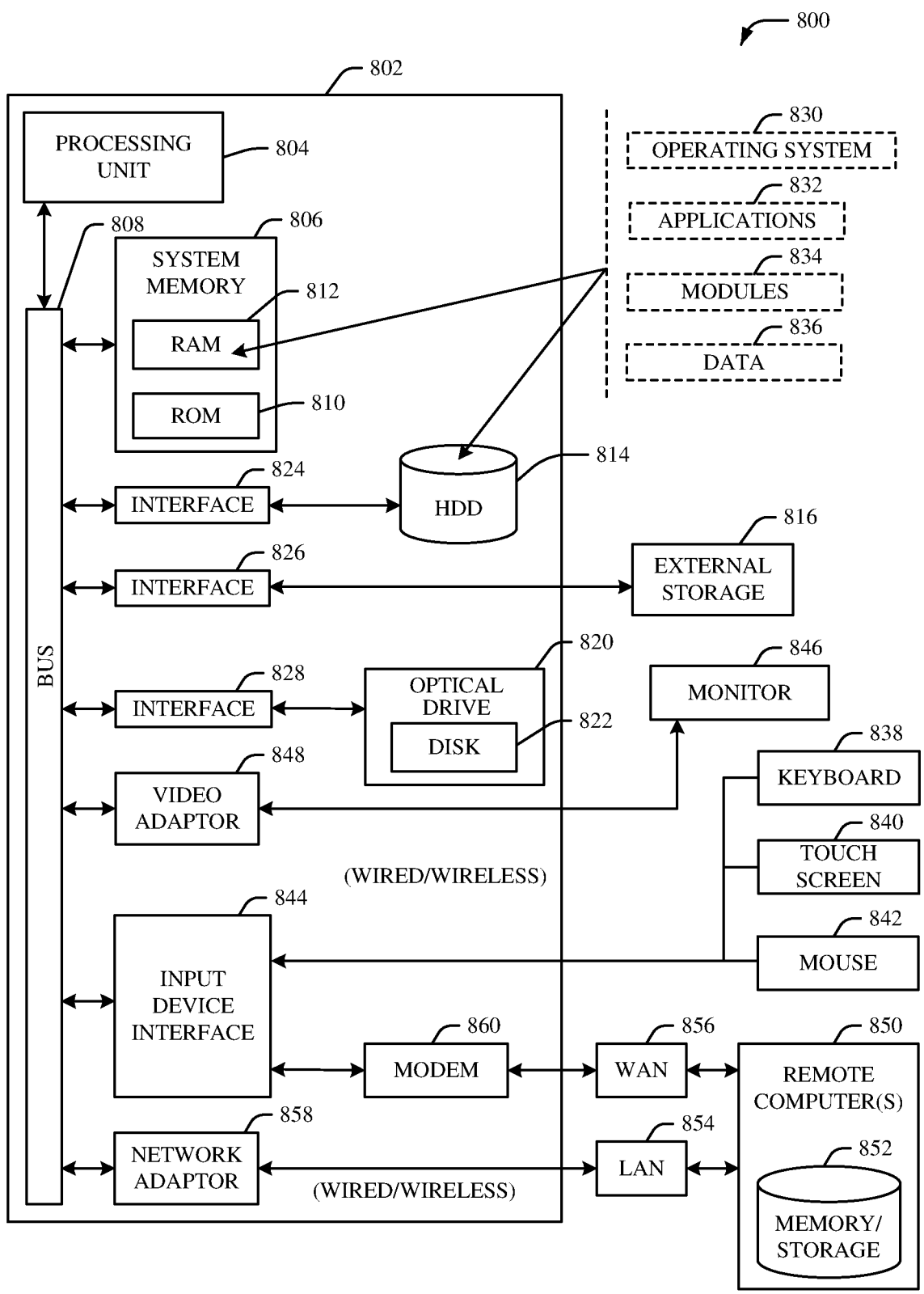
FIG. 8 illustrates an example block diagram of an example computing environment in which the various embodiments of the embodiments described herein can be implemented.

In order to provide additional context for various embodiments described herein, FIG. 8 and the following discussion are intended to provide a brief, general description of a suitable computing environment 800 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments of the aspects described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a non-volatile memory such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, etc.). While the internal HDD 814 is illustrated as located within the computer 802, the internal HDD 814 can also be configured for external use in a suitable chassis (not shown). Additionally, while not shown in environment 800, a solid state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enable with a security module, such as a trusted processing module (TPM). For instance with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856, e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., storage system, connection manager component, node, update component, client device, processor component, data store, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    with regard to a client request, and in response to determining that a non-disruptive upgrade of a first group of nodes and a second group of nodes is in progress, determining, by a system comprising a processor, whether the first group of nodes is to be reduced to a first subgroup of nodes of the first group of nodes based at least in part on respective upgrade statuses of respective nodes of the first group of nodes and a first connection management criterion relating to a defined upgrade status, wherein the first connection management criterion indicates a defined threshold value relating to a number or a percentage of nodes associated with the defined upgrade status;
    in response to determining that the first group of nodes is to be reduced to the first subgroup of nodes, determining, by the system, a node of the first subgroup of nodes that is to be utilized to connect to a client device to service the client request based at least in part on a node characteristic associated with the first subgroup of nodes and a second connection management criterion relating to the node characteristic;
    determining, by the system, whether the second group of nodes satisfies the defined threshold value based at least in part on a result of analyzing statistical information relating to node characteristics, comprising the node characteristic, associated with the second group of nodes; and
    in response to determining that the second group of nodes does not satisfy the defined threshold value, determining, by the system, that the second group of nodes is not to be reduced to form a second subgroup of nodes.

2. The method of claim 1, further comprising:
    monitoring, by the system, node characteristics, comprising the node characteristic, associated with the respective nodes of the first group of nodes; and
    analyzing, by the system, the statistical information relating to the node characteristics.

3. The method of claim 2, wherein the result is a first result, and wherein the method further comprises:
    determining, by the system, whether the first group of nodes satisfies the defined threshold value based at least in part on a second result of the analyzing of the statistical information; and
    in response to determining that the first group of nodes satisfies the defined threshold value, determining, by the system, that the first group of nodes is to be reduced to form the first subgroup of nodes, wherein the first subgroup of nodes comprises one or more nodes that are associated with the defined upgrade status, and wherein the first subgroup of nodes contains at least one less node than the first group of nodes.

4. The method of claim 2, wherein the result is a first result, wherein the determining the node of the first subgroup of nodes that is to be utilized to connect to the client device to service the client request comprises determining the node of the first subgroup of nodes that is to be utilized to connect to the client device to service the client request based at least in part on a second result of the analyzing of the statistical information, and wherein the result of the analyzing of the statistical information indicates that a parameter value relating to the node characteristic and associated with the node satisfies the second connection management criterion relating to the node characteristic.

5. The method of claim 1, wherein
    the statistical information relating to the node characteristics associated with the second group of nodes comprises upgrade status information relating to update status in connection with the non-disruptive upgrade.

6. The method of claim 1, wherein the node is a first node, wherein the client device is a first client device, wherein the client request is a first client request, wherein the result is a first result, and wherein the method further comprises:
    determining, by the system, a second node of the second group of nodes that is to be utilized to connect to a second client device to service a second client request based at least in part on a second result of the analyzing of the statistical information, wherein the second result of the analyzing of the statistical information indicates that a parameter value relating to the node characteristic and associated with the second node satisfies the second connection management criterion relating to the node characteristic, and wherein the second node is associated with an upgraded status or a non-upgraded status.

7. The method of claim 1, wherein the defined upgrade status is one of an upgraded status or a non-upgraded status, wherein the upgraded status indicates software or firmware of a particular node of the first group of nodes has been upgraded during the non-disruptive upgrade, and wherein the non-upgraded status indicates the software or the firmware of the particular node has not been upgraded yet during the non-disruptive upgrade.

8. The method of claim 7, further comprising:
determining, by the system, that the particular node has not been upgraded and has the non-upgraded status, in response to detecting an error indication with regard to an upgrade status of the particular node.

9. The method of claim 1, wherein the node characteristic relates to respective amounts of resource utilization associated with respective nodes of the first subgroup, respective throughput levels associated with the respective nodes of the first subgroup, respective connection counts associated with the respective nodes of the first subgroup, or an ordering of the respective nodes of the first subgroup of nodes, and wherein a connection count of the respective connection counts relates to a number of connection sessions between the node and one or more client devices.

10. The method of claim 9, further comprising:
determining, by the system, that an amount of the resource utilization associated with the node is higher than other amounts of other resource utilizations associated with other nodes of the respective nodes of the first subgroup;
determining, by the system, that a throughput level associated with the node is higher than other throughput levels associated with the other nodes;
determining, by the system, that the connection count associated with the node is lower than other connection counts associated with the other nodes; or
determining, by the system, that the node is next in order relative to the other nodes based at least in part on the ordering of the respective nodes.

11. A system, comprising:
a memory that stores computer executable components; and
a processor that executes computer executable components stored in the memory, wherein the computer executable components comprise:
an update component that performs a non-disruptive upgrade of a first group of nodes and a second group of nodes; and
a connection manager component that, in response to determining that the non-disruptive upgrade of the first group of nodes is in progress, determines whether to form a first subgroup of nodes from the first group of nodes based at least in part on respective upgrade statuses of respective nodes of the first group of nodes and a first connection management criterion relating to a defined node upgrade status, wherein the first subgroup of nodes is associated with the defined node upgrade status, and wherein the first connection management criterion indicates a defined threshold value relating to a number or a percentage of nodes associated with the defined node upgrade status,
wherein, in response to determining that the first subgroup of nodes is to be formed from the first group of nodes, the connection manager component determines a node of the first subgroup of nodes that is to be utilized to connect to a client device to service a client request based at least in part on a node attribute associated with the first subgroup of nodes and a second connection management criterion relating to the node attribute,
wherein, in response to determining that the non-disruptive upgrade of the second group of nodes is in progress, the connection manager component determines whether the second group of nodes satisfies the defined threshold value based at least in part on a result of an analysis of statistical data relating to node attributes, comprising the node attribute, associated the second group of nodes, and
wherein, in response to determining that the second group of nodes does not satisfy the defined threshold value, the connection manager component determines that a second subgroup of nodes is not to be formed from the second group of nodes.

12. The system of claim 11, wherein the connection manager component monitors node attributes, comprising the node attribute, associated with the respective nodes of the first group of nodes, and analyzes the statistical data relating to the node attributes.

13. The system of claim 12, wherein the result is a first result;
wherein the connection manager component determines whether the first group of nodes satisfies the defined threshold value based at least in part on a second result of the analysis of the statistical data; and
wherein, in response to determining that the first group of nodes satisfies the defined threshold value, the connection manager component determines that the first subgroup of nodes is to be formed from the first group of nodes, wherein the first subgroup of nodes comprises one or more nodes that are associated with the defined upgrade status, and wherein the first subgroup of nodes contains at least one less node than the first group of nodes.

14. The system of claim 12, wherein the result is a first result, wherein the connection manager component determines the node of the first subgroup of nodes that is to be utilized to connect to the client device to service the client request based at least in part on a second result of the analysis of the statistical data, wherein the result of the analysis of the statistical data indicates that a parameter value relating to the node attribute and associated with the node satisfies the second connection management criterion relating to the node attribute, and wherein the node comprises at least one of a processor component, a data store, a network component, or an interconnect component.

15. The system of claim 11, wherein
the statistical data relating to the node attributes associated the second group of nodes comprises upgrade status data relating to update status in connection with the non-disruptive upgrade.

16. The system of claim 11, wherein the node is a first node, wherein the client device is a first client device, wherein the client request is a first client request, and wherein the result is a first result; and
wherein the connection manager component determines a second node of the second group of nodes that is to be utilized to connect to a second client device to service a second client request based at least in part on a second result of the analyzing of the statistical data, wherein the second result of the analyzing of the statistical data indicates that a parameter value relating to the node attribute and associated with the second node satisfies the second connection management criterion relating to the node attribute, and wherein the second node is associated with an upgraded status or a non-upgraded status.

17. The system of claim 11, wherein the defined upgrade status is one of an upgraded status or a non-upgraded status, wherein the upgraded status indicates software or firmware of a particular node of the first group of nodes has been upgraded during the non-disruptive upgrade, and wherein the non-upgraded status indicates the software or the firmware of the particular node has not been upgraded yet during the non-disruptive upgrade.

18. The system of claim 11, wherein the node attribute relates to respective amounts of resource utilization associated with respective nodes of the first subgroup, respective aggregate throughput levels associated with the respective nodes of the first subgroup, respective connection counts associated with the respective nodes of the first subgroup, or an ordering of the respective nodes of the first subgroup of nodes, wherein a connection count of the respective connection counts relates to a number of connection sessions between the node and one or more client devices; and
wherein the connection manager component:
determines that an amount of the resource utilization associated with the node is higher than other amounts of other resource utilizations associated with other nodes of the respective nodes of the first subgroup,
determines that an aggregate throughput level associated with the node is higher than other aggregate throughput levels associated with the other nodes,
determines that the connection count associated with the node is lower than other connection counts associated with the other nodes, or
determines that the node is next in order relative to the other nodes based at least in part on the ordering of the respective nodes.

19. A non-transitory machine-readable medium, comprising executable instructions that, when executed by a processor, facilitate performance of operations, comprising:
in connection with a client request, and in response to determining that a non-disruptive upgrade of a first set of nodes and a second set of nodes is occurring, determining whether to form a first subset of nodes from the first set of nodes based at least in part on respective upgrade statuses of respective nodes of the first set of nodes and a first connection management criterion relating to a defined node upgrade status, wherein the first subset of nodes is associated with the defined node upgrade status, wherein the first subset of nodes contains at least one less node than the set of nodes, and wherein the first connection management criterion indicates a defined threshold value relating to a number or a percentage of nodes associated with the defined node upgrade status;
in response to determining that the first subset of nodes is to be formed from the first set of nodes, determining a node of the first subset of nodes that is to be utilized to connect to a client device to service the client request based at least in part on a node characteristic associated with the first subset of nodes and a second connection management criterion relating to the node characteristic;
determining whether the second set of nodes satisfies the defined threshold value based at least in part on a result of analyzing statistical information relating to node characteristics, comprising the node characteristic, associated with the second set of nodes; and
in response to determining that the second set of nodes does not satisfy the defined threshold value, determining that the second set of nodes is not to be reduced to form a second subset of nodes.

20. The non-transitory machine-readable medium of claim 19, wherein the defined upgrade status is one of an upgraded status or a non-upgraded status, wherein the upgraded status indicates software or firmware of a particular node of the first set of nodes has been upgraded during the non-disruptive upgrade, and wherein the non-upgraded status indicates the software or the firmware of the particular node has not been upgraded yet during the non-disruptive upgrade.

* * * * *